United States Patent [19]

Sugihara et al.

[11] Patent Number: 5,522,140
[45] Date of Patent: * Jun. 4, 1996

[54] CUTTING HEAD FOR A CORD TYPE MOWER

[75] Inventors: Hideo Sugihara; Hajime Tomita, both of Gifu-ken, Japan

[73] Assignee: Diatop Corporation, Gifu-ken, Japan

[*] Notice: The portion of the term of this patent subsequent to Mar. 22, 2011, has been disclaimed.

[21] Appl. No.: 206,253

[22] Filed: Mar. 4, 1994

Related U.S. Application Data

[60] Continuation of Ser. No. 998,420, Dec. 30, 1992, Pat. No. 5,295,306, which is a division of Ser. No. 792,788, Nov. 15, 1991, Pat. No. 5,222,301.

[30] Foreign Application Priority Data

Nov. 16, 1990 [JP] Japan .................................. 2-312500

[51] Int. Cl.$^6$ .................................. A01D 34/63
[52] U.S. Cl. .................................. 30/276; 30/347
[58] Field of Search .................. 30/276, 347; 56/12.7, 56/239

[56] References Cited

U.S. PATENT DOCUMENTS

| | | | |
|---|---|---|---|
| 4,104,796 | 8/1978 | Sheldon | 30/276 |
| 4,161,820 | 7/1979 | Moore | 30/276 |
| 4,183,138 | 1/1980 | Mitchell et al. | 30/276 |
| 4,189,833 | 2/1980 | Kwater | 30/276 |
| 4,347,666 | 9/1982 | Moore | 30/276 |
| 4,476,632 | 10/1984 | Proulx | 30/276 |
| 4,483,069 | 11/1984 | Moore | 30/276 |
| 4,557,052 | 12/1985 | Baba et al. | 30/276 |
| 4,561,180 | 12/1985 | Pittinger et al. | 30/276 |
| 4,566,189 | 1/1986 | Muto | 30/276 |
| 4,599,796 | 7/1986 | Baba | 30/276 |
| 4,607,431 | 8/1986 | Gay | 30/276 |
| 4,660,286 | 4/1987 | Engelbrecht et al. | 30/276 |
| 4,672,798 | 6/1987 | Ota | 56/12.7 |
| 4,702,005 | 10/1987 | Pittinger, Sr. et al. | 30/276 |
| 4,817,288 | 4/1989 | Hirose et al. | 30/276 |
| 4,823,465 | 4/1989 | Collins | 30/276 |
| 4,866,846 | 9/1989 | Hoffman et al. | 30/276 |
| 4,893,410 | 1/1990 | Hoffmann et al. | 30/276 |
| 4,897,923 | 2/1990 | Collins | 30/276 |
| 4,989,321 | 2/1991 | Hoffmann | 30/276 |
| 5,010,649 | 4/1991 | Hoffman | 30/276 |
| 5,020,224 | 6/1991 | Haupt | 30/276 |
| 5,095,688 | 3/1992 | Fabrizio | 30/276 |
| 5,222,301 | 6/1993 | Sugihara et al. | 30/276 |
| 5,293,691 | 3/1994 | Sugihara et al. | 30/276 |
| 5,293,692 | 3/1994 | Sugihara et al. | 30/276 |
| 5,295,306 | 3/1994 | Sugihara et al. | 30/276 |
| 5,311,665 | 5/1994 | Sugihara et al. | 30/276 |

FOREIGN PATENT DOCUMENTS

| | | |
|---|---|---|
| 467006A1 | 1/1992 | European Pat. Off. . |
| 0486326A2 | 5/1992 | European Pat. Off. . |
| 2429550 | 1/1980 | France . |
| 3922339 | 7/1989 | Germany . |
| 59-22484 | 5/1984 | Japan . |
| 216595 | 8/1984 | Japan . |
| 60-83508 | 5/1985 | Japan . |
| 226922 | 11/1986 | Japan . |
| 63-79522 | 4/1988 | Japan . |
| 2163003 | 6/1990 | Japan . |
| 8500160 | 4/1985 | WIPO . |
| WO8504548 | 10/1985 | WIPO | A01D 34/0004 |

*Primary Examiner*—Hwei-Siu Payer
*Attorney, Agent, or Firm*—Stetina Brunda & Buyan

[57] ABSTRACT

A cutting head for a cord-type mower driven by an engine is disclosed. The cutting head includes a rotor capable of rotating about an axis and a bobbin with a cord wound on it. The bobbin can rotate relatively to the rotor about the axis in the rotor. The cutting head includes two types of cord feeding systems. The first cord feeding system automatically feeds a cord in response to cord wear. The second cord feeding system feeds a cord in response to a manual tapping operation executed during driving of the cutting head. The second cord feeding system disconnects one of the bobbin and rotor from the engine in response to the tapping operation.

6 Claims, 39 Drawing Sheets

CUTTING HEAD FOR A CORD TYPE MOWER

This application is a continuation of application Ser. No. 07/998,420, filed Dec. 30, 1992, now U.S. Pat. No. 5,295,306 which is a division of Ser. No. 07/792,788, filed on Nov. 15, 1991 now U.S. Pat. No. 5,222,301.

This application claims the priority of Japanese Patent Application No. 2-312500 filed on Nov. 16, 1990 which is incorporated herein by reference.

BACKGROUND OF THE INVENTION

1. Field of the Invention

The present invention relates generally to a cutting head for a cord type mower. More particularly, the present invention relates to a cord feeding system for extending a cord wound on a bobbin in a rotary casing to a length necessary for mowing.

2. Description of the Related Art

Many conventional cord type mowers have systems in their cutting heads for feeding new cord when the current cord length is insufficient. Also, manual-type cutting heads are known which permit manual extension of the cord wound on a bobbin.

At present, the so called tap-and-go type and automatic type cutting heads are popular. For the tap-and-go type, the cord is feed the required length by releasing an interlock between a bobbin and a rotary casing. The interlock is released either by hitting or strongly pressing the rotary casing against the ground. This type of cutting head is disclosed in, for example, Japanese Utility Model Publication No. 2-16595, Japanese Patent Publication No. 2-26922, U.S. Pat. No. 4,161,820, U.S. Pat. No. 4,183,138, and U.S. Pat. No. 4,189,833.

For the automatic type, the interlock between the bobbin and rotary casing is released by the centrifugal force which changes according to the length of the cord that extends from the rotary casing. Thus, the desired cord length can be maintained. This type of cutting head is disclosed in, for example, Japanese Patent Publication No. 59-22484, Japanese Patent Laid-open No. 60-83508, Japanese Patent Laid-open No. 63-79522, Japanese Patent Laid-open No. 2-163003, U.S. Pat. No. 4,347,666, U.S. Pat. No. 4,607,431, U.S. Pat. No. 4,660,286, and U.S. Pat. No. 4,817,288.

For the tap-and-go type, it is necessary for the operator to frequently check the length of the cord consumed during mowing and extend the cord by hitting the rotary casing against the ground at times or strongly pressing it. Otherwise, the mowing efficiency greatly decreases. Therefore, the operator always has to execute checking and hitting. The checking and hitting give a large mental burden and physical load to the operator.

However, the tap-and-go type has the advantage that the operator can freely set the cord length according to the state of the material (such as grass) being cut. For example, when grass is soft, it is possible to improve the operation efficiency by extending the cord length which permits to the cutter to mow at a faster rate. When grass is hard, it is possible to insure that the grass is cut by setting the cord length to a relatively small value, which increases the cutting force of the cord. Therefore, some operators prefer the advantage of optionally setting the cord length according to the situation to the labor saving advantages of the automatic feeding devices.

Automatic type feed mechanism automatically extends the cord after it has been worn to a predetermined length. Because the extending length depends on the characteristics of the elastic body and heavy bob set in the rotary casing, it is limited to a predetermined range. Therefore, to change the extending length, the elastic body and heavy bob should be changed. However, it is very troublesome to change the parts according to the type of operation. Therefore, the cord length is normally preset to an average length required during operation in a variety of situations.

Because the cord is automatically extended when the cord is worn due to mowing, the automatic-type cutting head does not require hitting by the operator and is therefore easier to operate. However, because the operator cannot optionally select the cord length, it is impossible to extend the cord longer than the set length or keep the cord shorter than the set length.

Thus, the tap-and-go type and the automatic type each have their own features. However, each of the features appears as both an advantage or disadvantage. Because the tap-and-go type allows the operator to optionally select the cord length, it easier for professional operators to use because it operates more efficiently.

The tap-and-go type, however, requires the operator to always pay attention to the cord length and also requires that the rotary casing be hit when the remaining cord becomes short. Therefore, during prolonged mowing, this type gives a larger burden and physical load to the operator. Thus, the request (or demand) for the automatic type has recently been increasing in the professional market.

SUMMARY OF THE INVENTION

Accordingly, it is a primary objective of the present invention to provide a compact automatic-type cutting head that can optionally incorporate a tap-and-go function, which can compensate for the disadvantages of the both types.

To achieve the foregoing and other objects and in accordance with the purpose of the present invention, an improved cutting head for a cord-type mower is provided. The cord-type mower has an engine for driving the cutting head. The cutting head includes a rotor which can rotate about an axis and a bobbin on which a cord is wound. The bobbin is mounted in the rotor so that it can rotate relatively to the rotor about the axis. A cord feed slot for leading the distal end of the cord from the bobbin to the outside of the rotor is formed on the periphery of the rotor. Moreover, the cutting head has two types of cord feeding systems.

The first cord feeding system automatically feeds the cord in response to cord wear. The first cord feeding system is arranged to selectively disengage one of the bobbin and rotor from the engine to feed a predetermined length of the cord through the cord feed slot. The disengaged one of the bobbin and rotor slips relative to the other when it is disengaged.

The second cord feeding system feeds the cord in response to a tapping operation that is executed while the cutting head is being driven. The second cord feeding system disconnects one of the bobbin and rotor from the engine in response to the tapping operation. Again, this causes the disengaged one of the bobbin and rotor to slip relative to the other.

BRIEF DESCRIPTION OF THE DRAWINGS

The features of the present invention that are believed to be novel are set forth with particularly in the appended claims. The invention, together with the objects and advantages thereof, may best be understood by reference to the following description of the presently preferred embodiments together with the accompanying drawings in which:

FIG. 1 is a side view of a first embodiment of a cord-type mower in accordance with the present invention;

FIG. 2 is a sectional view of a cutting head;

FIG. 3 is a partial sectional view of the cutting head showing a position different from the cutting position in FIG. 2;

FIG. 4 is a sectional view of the cutting head of FIG. 2, taken along the line 4—4 of FIG. 2;

FIG. 5 is a sectional view of the cutting head of FIG. 2, taken along the line 5—5 of FIG. 2;

FIG. 6 is a sectional view of the cutting head of FIG. 2, taken along the line 6—6 of FIG. 2;

FIG. 7 is an exploded perspective view of the cutting head;

FIG. 8 is a perspective view of the control plate constituting the cutting head;

FIG. 9 is a perspective view of the bobbin constituting the cutting head;

FIG. 10 is a sectional view of the cutting head performing the tap-and-go operation;

FIG. 11 is a sectional view of the cutting head of FIG. 10, taken along the line 11—11 of FIG. 10;

FIG. 12 is a sectional view of the cutting head of FIG. 10, taken along the line 12—12 of FIG. 10;

FIG. 13 is a partially sectional view of a cutting head corresponding to FIG. 3, in which the cutting head serves as one dedicated to the tap-and-go operation using a stopper pin;

FIG. 14 is a sectional view of a cutting head corresponding to FIG. 2 of the first embodiment;

FIG. 15 is a partially sectional view of a cutting head corresponding to FIG. 3 of the first embodiment;

FIG. 16 is a sectional view of the cutting head of FIG. 14, taken along the line 16—16 of FIG. 14;

FIG. 17 is a sectional view of the cutting head of FIG. 14, taken along the line 17—17 of FIG. 14;

FIG. 18 is a sectional view of the cutting head of FIG. 14, taken along the line 18—18 of FIG. 14;

FIG. 19 is a sectional view of a cutting head corresponding to FIG. 10 of the first embodiment;

FIG. 20 is a sectional view of the cutting head of FIG. 19, taken along the line 20—20 of FIG. 19;

FIG. 21 is a sectional view of the cutting head of FIG. 19, taken along the line 21—21 of FIG. 19;

FIG. 22 is a partially sectional view of a cutting head corresponding to FIG. 13 of the first embodiment;

FIG. 23 is a sectional view of a cutting head corresponding to FIG. 2 of the first embodiment;

FIG. 24 is a sectional view of the cutting head of FIG. 23, taken along the line 24—24 of FIG. 23;

FIG. 25 is a sectional view of the cutting head of FIG. 23, taken along the line 25—25 of FIG. 23;

FIG. 26 is a sectional view of a cutting head automatically feeding cords;

FIG. 27 is a sectional view of the cutting head of FIG. 26, taken along the line 27—27 of FIG. 26;

FIG. 28 is a sectional view of the cutting head of FIG. 26, taken along the line 28—28 of FIG. 26;

FIGS. 29 and 30 are sectional views of the cutting head serving as one dedicated to the tap-and-go operation using a stopper pin;

FIG. 31 is a sectional view of a cutting head corresponding to FIG. 2 of the first embodiment;

FIG. 32 is a partially sectional view of a cutting head corresponding to FIG. 3 of the first embodiment;

FIG. 33 is a sectional view of the cutting head of FIG. 31, taken along the line 33—33 of FIG. 31;

FIG. 34 is a sectional view of the cutting head of FIG. 31, taken along the line 34—34 of FIG. 31;

FIG. 35 is a sectional view of the cutting head of FIG. 31, taken along the line 35—35 of FIG. 31;

FIG. 36 is a sectional view of a cutting head corresponding to FIG. 10 of the first embodiment;

FIG. 37 is a sectional view of the cutting head of FIG. 36, taken along the line 37—37 of FIG. 36;

FIG. 38 is a sectional view of the cutting head of FIG. 36, taken along the line 38—38 of FIG. 36;

FIG. 39 is a partially sectional view of a cutting head corresponding to FIG. 13 of the first embodiment;

FIG. 40 is a sectional view of a cutting head corresponding to FIG. 2 of the first embodiment;

FIG. 41 is a partially sectional view of a cutting head corresponding to FIG. 3 of the first embodiment;

FIG. 42 is a sectional view of the cutting head of FIG. 40, taken along the line 42—42 of FIG. 40;

FIG. 43 is a sectional view of the cutting head of FIG. 40, taken along the line 43—43 of FIG. 40;

FIG. 44 is a sectional view of the cutting head of FIG. 40, taken along the line 44—44 of FIG. 40;

FIG. 45 is a sectional view of a cutting head corresponding to FIG. 10 of the first embodiment;

FIG. 46 is a sectional view of the cutting head of FIG. 40, in which drive rinks are moved from the state in FIG. 42 due to the centrifugal force;

FIG. 47 is a sectional view of the cutting head of FIG. 45, taken along the line 47—47 of FIG. 45;

FIG. 48 is a sectional view of the cutting head of FIG. 45, taken along the line 48—48 of FIG. 45;

FIG. 49 is a partially sectional view of a cutting head corresponding to FIG. 13 of the first embodiment;

FIG. 50 is a sectional view of a cutting head corresponding to FIG. 2 of the first embodiment;

FIG. 51 is a partially sectional view of a cutting head corresponding to FIG. 3 of the first embodiment;

FIG. 52 is a sectional view of the cutting head of FIG. 50, taken along the line 52—52 of FIG. 50;

FIG. 53 is a sectional view of the cutting head of FIG. 50, taken along the line 53—53 of FIG. 50;

FIG. 54 is a sectional view of the cutting head of FIG. 50, taken along the line 54—54 of FIG. 50;

FIG. 55 is a sectional view of a cutting head corresponding to FIG. 10 of the first embodiment;

FIG. 56 is a sectional view of the cutting head of FIG. 55, taken along the line 56—56 of FIG. 55;

FIG. 57 is a sectional view of the cutting head of FIG. 55, taken along the line 57—57 of FIG. 55;

FIG. 58 is a partially sectional view of a cutting head corresponding to FIG. 13 of the first embodiment;

FIG. 59 is a sectional view of a cutting head corresponding to FIG. 2 of the first embodiment;

FIG. 60 is a partially sectional view of the cutting head in FIG. 59, viewed in a position 45° displaced from the sectional position in FIG. 59;

FIG. 61 is a sectional view of the cutting head of FIG. 59, taken along the line 61—61 of FIG. 59;

FIG. 62 is a sectional view of the cutting head of FIG. 59, taken along the line 62—62 of FIG. 59;

FIG. 63 is a sectional view of the cutting head of FIG. 59, taken along the line 63—63 of FIG. 59;

FIG. 64 is a sectional view of a cutting head automatically feeding cords;

FIG. 65 is a sectional view of a cutting head during tapping;

FIG. 66 is a sectional view of the cutting head of FIGS. 64 and 65, taken along the line 66—66 of FIGS. 64 and 65;

FIG. 67 is a partially sectional view of a cutting head;

FIGS. 68 and 69 show a cutting head viewed from the bottom of it without a cover constituting the casing of the cutting head;

FIG. 70 is a partially sectional view of a cutting head during tapping;

FIG. 71 is a partially sectional view of a cutting head serving as one dedicated to the tap-and-go operation using a stopper pin; and FIG. 72 is a partial view of the cutting head in FIG. 71 viewed from the bottom of it.

DETAILED DESCRIPTION OF THE PREFERRED EMBODIMENTS

The first through eighth embodiments of the present invention will be described below with reference to the accompanying drawings.

First embodiment

Figure 1:
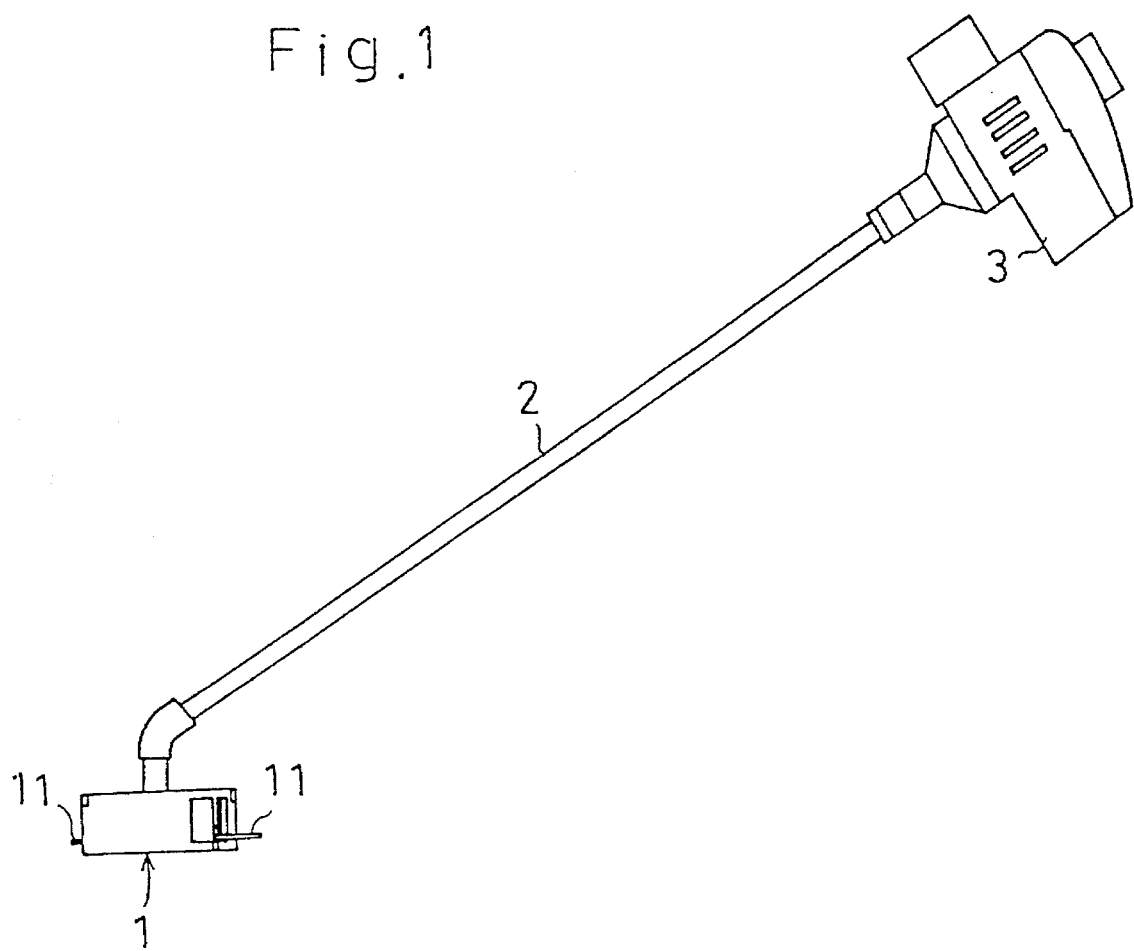
FIGS. 1 through 13 show a first embodiment of the present invention.

The first embodiment of the present invention is described below according to FIGS. 1 through 13. As shown in FIG. 1, the cord type mower has a cutting head 1, an engine 3, and a shaft tube 2. The shaft tube 2 connects the head 1 with the engine 3 and transmits the power of the engine 3 to the head 1. The head 1 is operated by the engine 3 through the tube 2. The following is the detailed description of the head 1.

Figure 2:
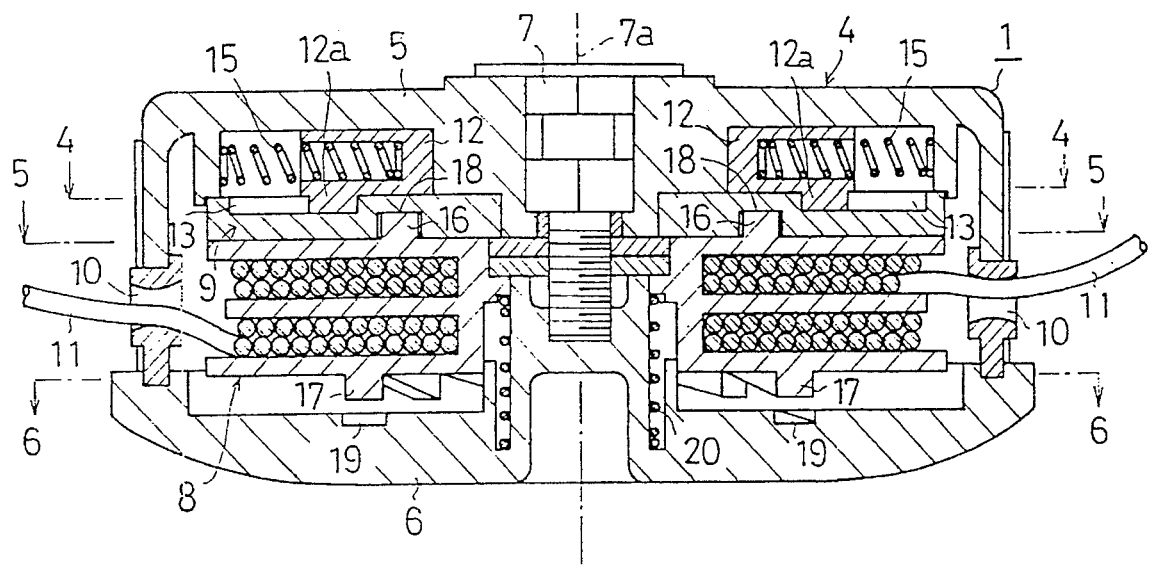

As shown in FIG. 2, a rotary casing 4 of the head 1 has a housing 5 and a protective cover 6. The casing 4 is connected to a drive shaft (not illustrated) rotatably installed in the tube 2 by a center bolt 7 at the center of the housing 5. Therefore, the housing 5 and the cover 6 are rotated together around an axis 7a of the center bolt 7.

A bobbin 8 and a control plate 9 coupled to the bobbin 8 are stored in the casing 4 so that they can rotate around the axis 7a independently of the casing 4. A pair of cord feed slots 10 are provided on the outer periphery of the housing 5 and are spaced apart by an interval of 180°.

The bobbin 8 has upper and lower section and one of two cords 11 is wound about each bobbin section. The end of each cord 11 passes through an associated one of the slots 10 and extends outside the housing 5.

Figure 7:
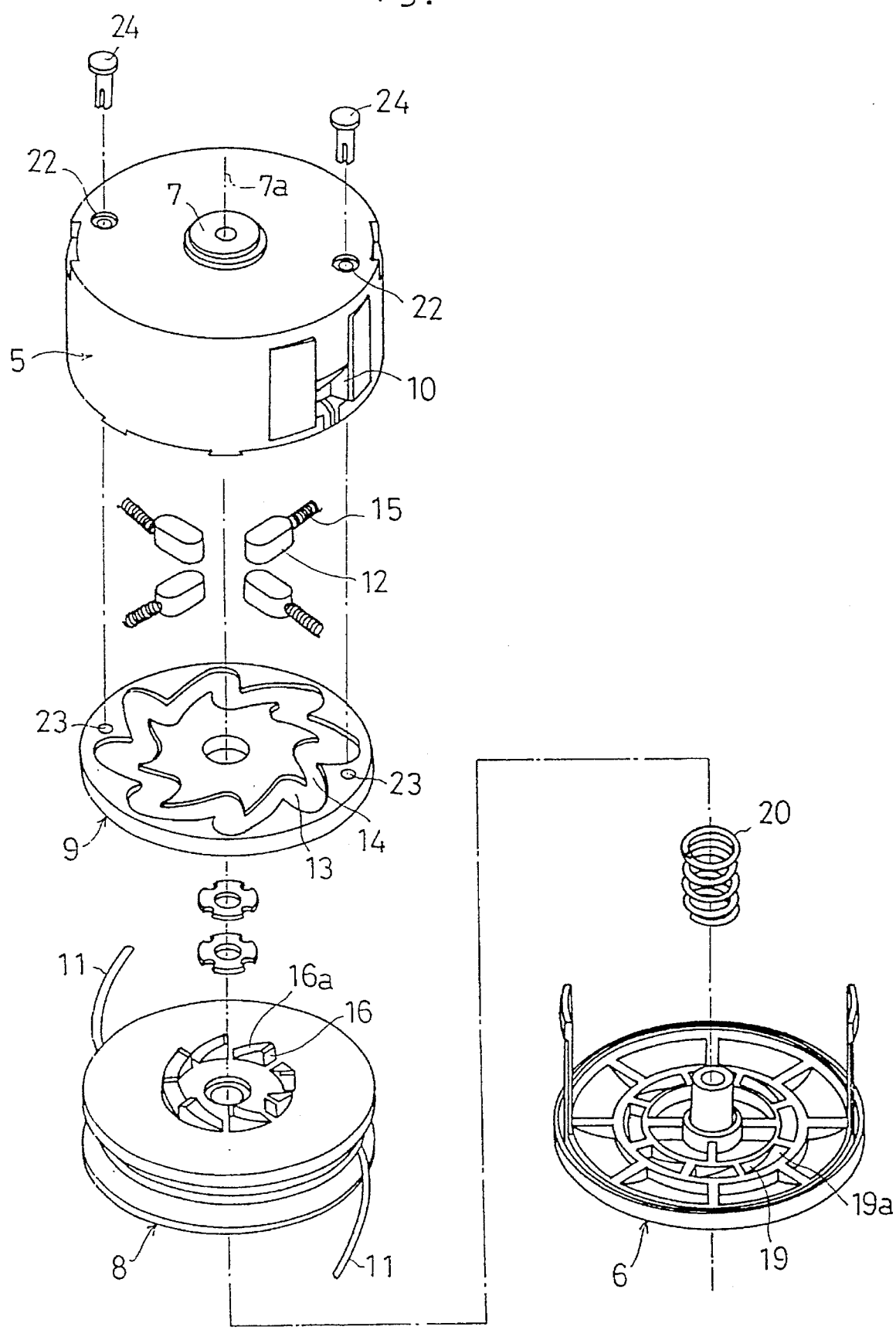

As shown in FIGS. 2 and 7, four drive links 12 are installed in the housing 5 such that they are positioned around the axis 7a at 90° intervals. Each link 12 can move in the radial direction of the housing 5 within the housing.

Figure 4:
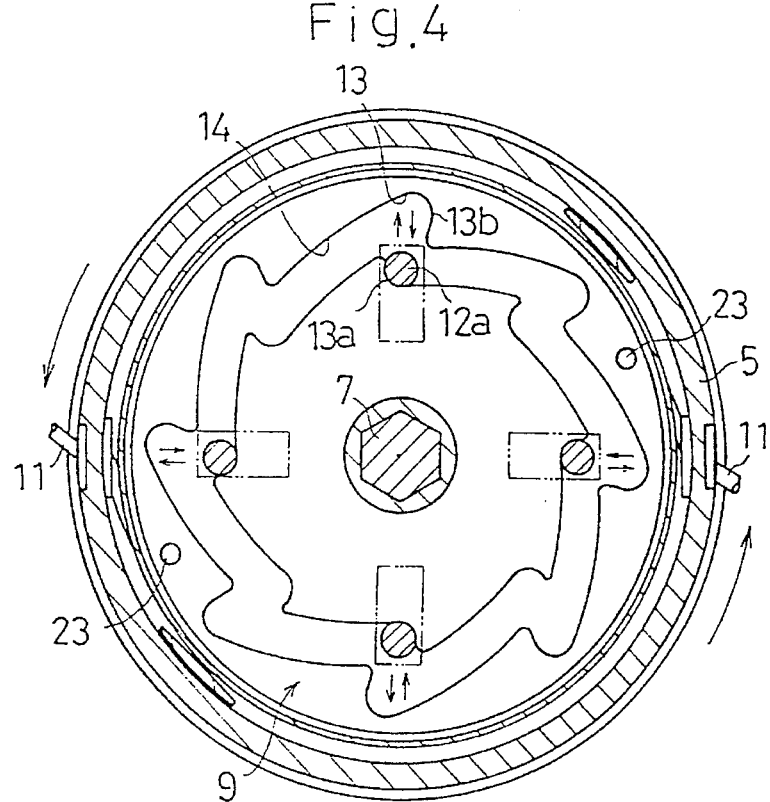

As shown in FIG. 4, a groove is provided in the top surface of the plate 9. The groove is composed of eight radial groove sections 13 and eight guide groove sections 14 that connect the radial grooves 13. The radial grooves 13 extend generally in the radial direction of the plate 9 and are provided at equal angular intervals about the center bolt 7. Adjacent radial and guide grooves 13 and 14 cooperate to form an inner step 13a nearer to the center bolt 7 and an outer step 13b farther from the center bolt 7.

A link stud 12a protrudes from the lower surface of each link 12. These link studs 12a extend into the plate groove. Thus, they are typically positioned in four of the radial groove sections 13. That is, in every other radial groove. Each link 12 is biased in the direction of the axis 7a by a compression coil spring 15 such that the link stud 12a is normally pressed against the step 13a of the groove 13 by the pressure of the spring 15. When the casing 4 is rotated under the above state, the plate 9 is rotated together with the casing 4 in the same direction due to the engagement with each link 12.

When the links 12 move radially outward against the pressure of the spring 15, the stud 12a of each link 12 moves from a position that engages the step 13a (i.e. stop position) toward the step 13b. When the stud 12a is released from the step 13a, the plate 9 relatively rotates in the direction opposite to the rotational direction of the casing 4 and the stud 12a moves to the linking position of the next radial groove 13 by following the guide groove 14.

Figure 9:
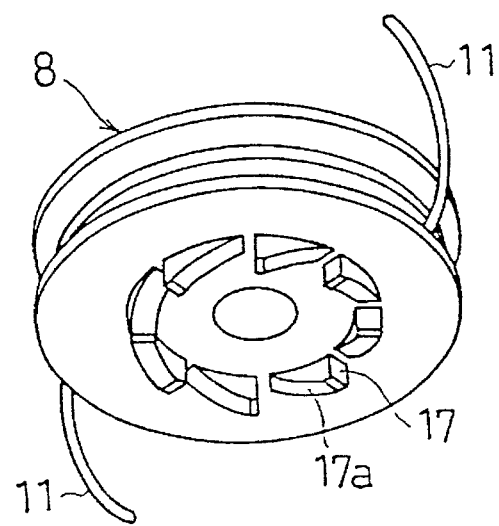

As shown in FIG. 7, eight projections 16 are provided on the top surface of the bobbin 8 at equally spaced intervals. Each projection includes a tapered surface 16a which tilts in the same direction as the projection. As shown in FIG. 9, eight projections 17 are provided on the bottom surface of the bobbin 8 at equally spaced intervals. The projections 17 thus each include a tapered surface 17a. Each projection 16 at the top and each projection 17 at the bottom are installed corresponding to the same angular position in a concentric circle. The surfaces 16a and 17a tilt in the opposite direction to each other.

Figure 8:
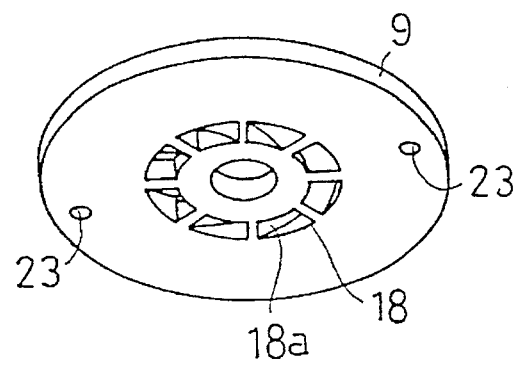

As shown in FIG. 8, eight tapered recesses 18 are formed on the bottom surface of the plate 9 at equally spaced intervals. The recesses 18 each include a tapered surface 18a. As shown in FIGS. 2 and 7, eight tapered recesses 19 are also formed on the inside bottom surface of the cover 6 at an equally spaced intervals. The recesses 19 also each include a tapered surface 19a.

Figure 5:
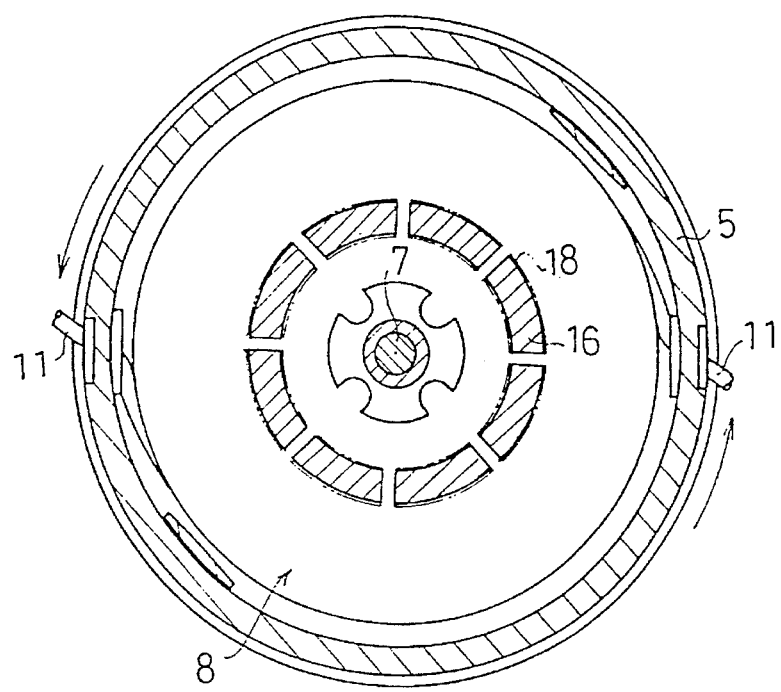
Figure 6:
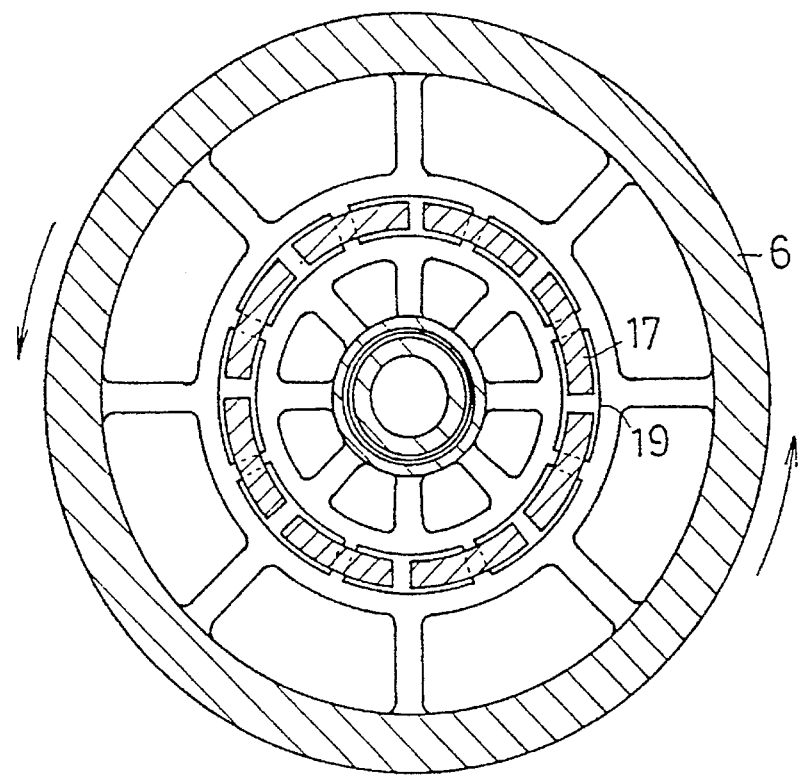

As shown in FIGS. 5 and 6, each tapered recess 18 of the plate 9 and each recess 19 of the cover 6 are arranged along the periphery so that the former are staggered from the latter by $2_\pi/16$ radians. In addition, the tapered surface 18 and the surface 19a tilt in the opposite directions.

The bobbin 8 can slide along the axis 7a in the casing 4 and is pressed upward by a compression coil spring 20 supported by the cover 6. As shown in FIGS. 2, 5, and 6, the pressure of the spring 20, pushes the projections 16 into the recesses 18 of the plate 9. At the same time, the projections 17 on the bottom surface of the bobbin 8 are separated from the recesses 19 of the cover 6.

Figure 10:
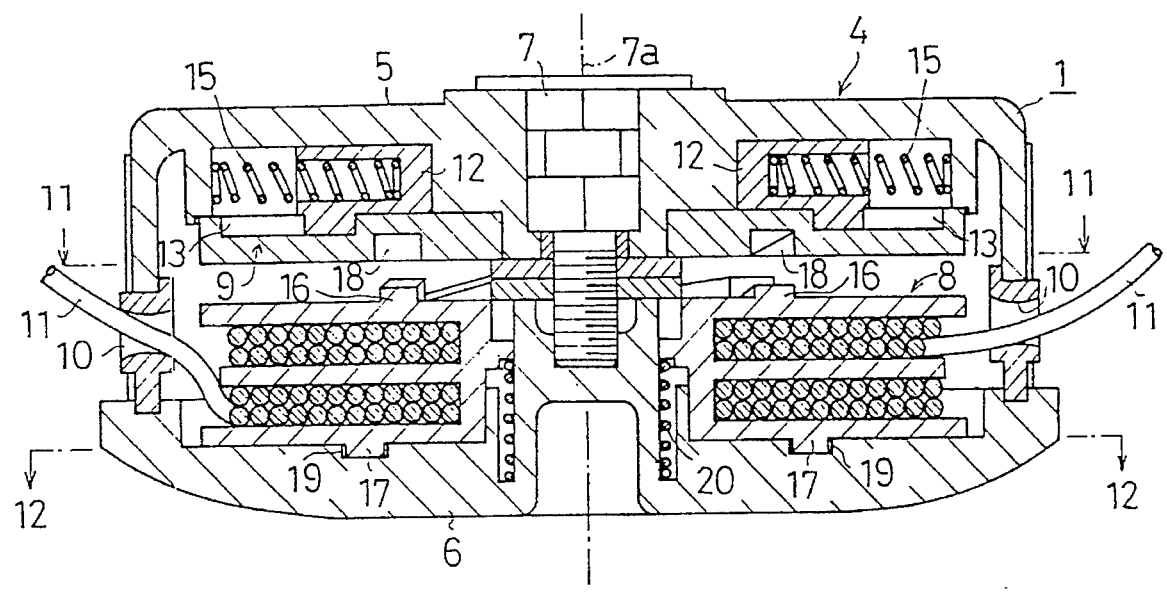
Figure 11:
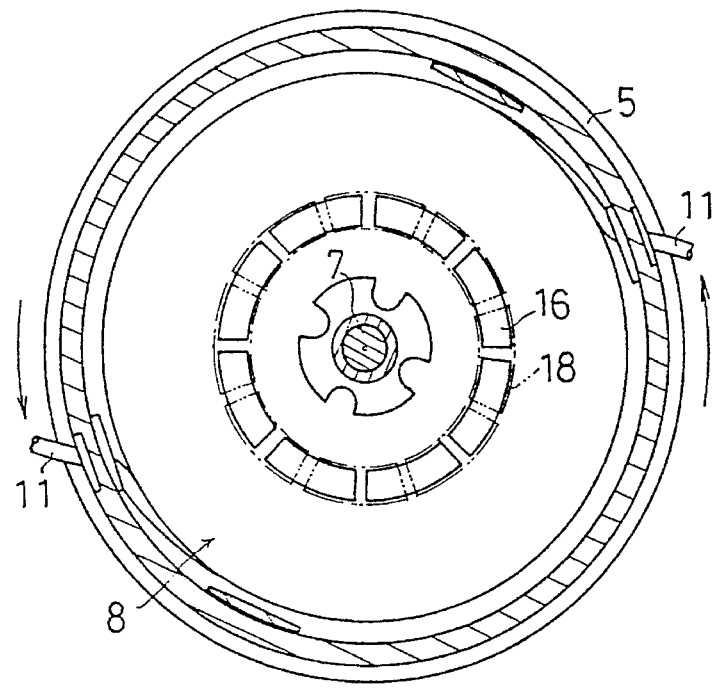
Figure 12:
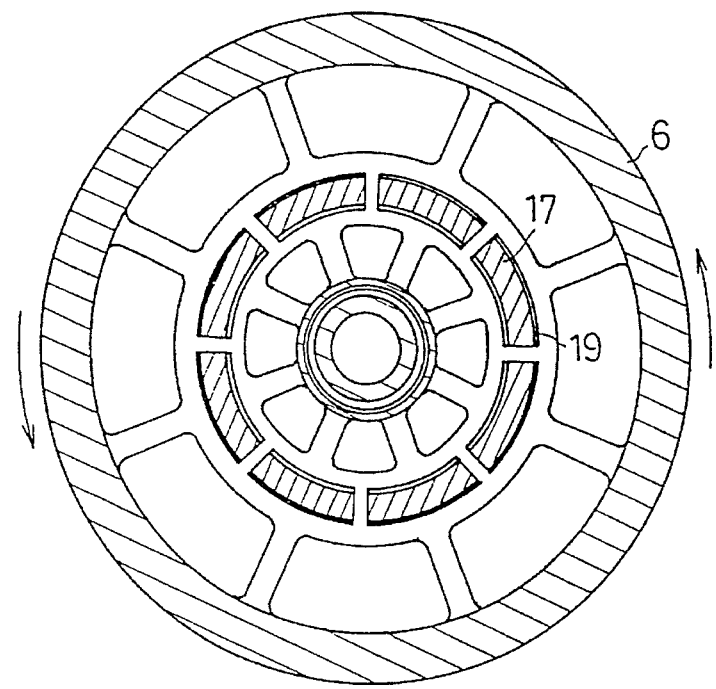

As shown in FIGS. 10, 11, and 12, when the bobbin 8 moves downward against the biasing force of the spring 20, the projections 16 on the top surface of the bobbin 8 separate from the recesses 18. At the same time, the projections 17 engage the recesses 19 in the cover 6.

As shown in FIG. 7, a pair of bores 22 are formed in the upper surface of housing 5 at positions separated by an interval of 180°. A pair of holes 23 are formed on the plate 9 such that they are aligned with the bores 22.

Figure 3:
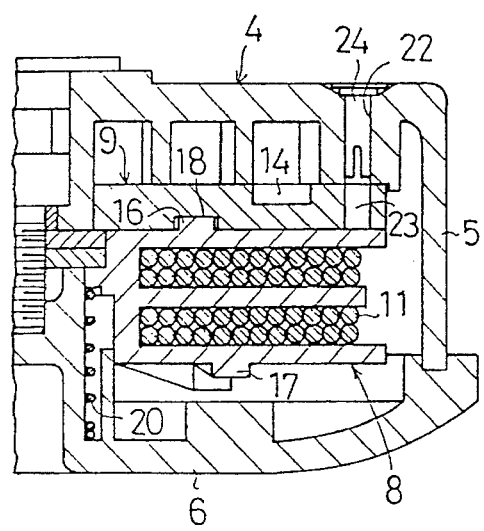
Figure 13:
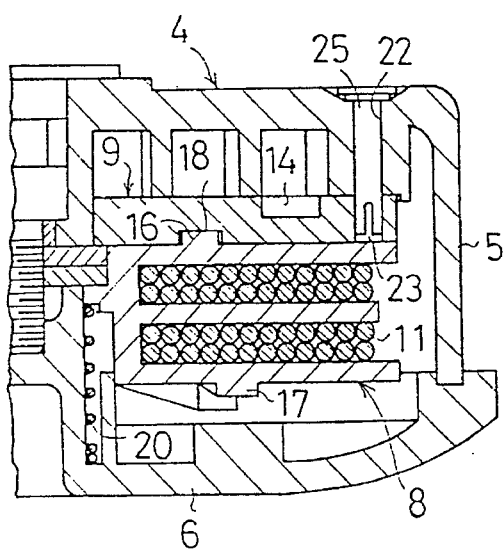

As shown in FIG. 3, when a short pin 24 is inserted into the bore 22 of the housing 5, the plate 9 can rotate independently of the housing 5. As shown in FIG. 13, however, when a long stopper pin 25 is inserted into the bore 22 of the housing 5 it extends into the hole 23 of the plate 9. Thus, the housing 5 always rotates together with the plate 9.

As shown in FIG. 3, when the short pin 24 is used, the head 1 has the automatic and tap-and-go feeding functions. In this configuration, when the casing 4 is rotated in the state shown in FIGS. 2 and 4, the plate 9 is rotated therewith due to its engagement with the link stud 12a. Moreover, the bobbin 8 is also rotated due to the fact that the top projections 16 engage the recesses 18 in plate 9. In this case, the cord 11 which extends through the slot 10 is also rotated to cut grass or the like.

When the cord 11 is consumed during mowing, the rotating resistance of the casing 4 decreases. Thus, the rotational speed of the casing 4 increases when compared to the speed attained when a normal length of the cord 11 extends from the casing (given a constant engine output). Therefore, the centrifugal force acting on the links 12 increases causing the links 12 to move radially outward against the pressure of the spring 15. Accordingly, the studs 12a move from the stop position in their corresponding radial grooves 13 to the release position.

In the release position, the stud 12a slides along the groove 14 due to the rotation of the casing 4. Specifically, since the rotation of the casing 4 is not transmitted to the plate 9. The bobbin 8 slips relative to the casing 4. Accordingly, the bobbin 8 rotates relatively to the casing 4.

The cord 11 is wound in a direction that is opposite to the rotational direction of the casing 4. When the plate 9 and the bobbin 8 slip relative to the casing 4, the slot 10 rotates together with the casing 4. Therefore, the distal end of the cord 11 follows the rotation of the casing 4. Thus, the cord 11 is feed into the internal space of the casing 4 a distance equivalent to the distance the bobbin 8 slips relative to the casing 4. Centrifugal force then draws the feed cord 11 outside of the casing through the slot 10.

As the cord 11 is feed, the rotational resistance of the casing 4 gradually increases which reduces the speed of the casing 4. As the speed of the casing 4 decreases, the centrifugal force working on the link 12 decreases and the link 12 returns toward the axis 7a by the force of the spring 15. Thus, the stud 12a of the link 12 reaches the stop position of the adjacent groove 13. As a result, the casing 4 has been rotated a distance of $2_\pi/8$ radians (45°) relative to the bobbin 8. Then, the plate 9 and the bobbin 8 rotate together with the casing 4 until the cord 11 is again worn due to use.

In this type of automatic system, after a predetermined length of the cord 11 has been worn, the extending operation is repeated and the cord 11 is automatically extended. It is possible to control the distance that the cord 11 extends beyond the slot after a feeding operation by adjusting the force provided by spring 15. That is, when the spring tension is set relatively high, the automatic feeding operation will not be executed until the length of cord extending from slot 10 is relatively short. Thus, the length of the cord after the feeding operation has been completed will be relatively shorter.

When the head 1 is used in the automatic mode, the length of the cord 11 to be feed from the slot 10 is normally set to a constant value in this type of automatic feeding. On the other hand, when the head is used in the tap-and-go mode, it is possible to extend the cord 11 a total distance that is longer than the above set value.

In the tap-and-go mode, the cord is feed by hitting the casing 4 against the ground. More specifically in the state shown in FIGS. 2, 5, and 6, the casing is hit against the ground while it rotates. The impact drives the bobbin 8 against the pressure of the spring 20 as shown in FIGS. 10, 11, and 12. The bottom projections 17 of the bobbin 8 thus contact the recesses 19 in the cover 6 in an offset manner. Thus, a part of the tapered surface 17a of the projection 17 contacts a part of the tapered surface 19a of the recess 19. The casing 4 and the plate 9 then rotate relative to the bobbin 8 by the amount the bottom projections 17 are offset from the recesses 19. That is $2_\pi/16$ radians. At this point, the bobbin 8 again rotates together with the casing 4 and the plate 9. While the bobbin 8 slips relative to the casing 4, the cord 11 is feed a corresponding amount.

Since the spring 20 is compressed by the downward moving bobbin 8 due to the inertia created by the hitting actions, the bobbin 8 is thereafter pushed upward by the action of the spring 20. The top projection 16 of the bobbin 8 is thus inserted into the recess 18 of the plate 9 and a part of the surface 16a of the projection 16 contacts a part of the surface 18a of the recess 18.

Then, similarly to the above mentioned, the casing 4 and the plate 9 rotate $2_\pi/16$ radians relative to the bobbin 8 which feeds the cord 11 accordingly. When the surface 16a completely fits with the surface 18a, the bobbin 8 again rotates together with the casing 4 and the plate 9. By using the described tap-and-go function, the cord 11 is extended from the bobbin 8 by the length corresponding to $4_\pi/16$ radians each time the casing is tapped.

The head 1 having both the automatic and tap-and-go systems makes it possible to set the length of the cord 11 longer than the extending length set by the automatic system by hitting the casing 4 against the ground as desired.

In another mode shown in FIG. 13, pins 25 are inserted into the housing bores 22 and the plate holes 23, the plate 9 does not rotate relatively to the casing 4 and the cord 11 is not automatically extended. Therefore, it is possible to operate only the tap-and-go system independently of the automatic system. In this case, the length of the cord 11 to be extended is determined according to the number of times the case is tapped.

As described above, because the head 1 of the first embodiment has both the automatic and tap-and-go systems, the operator can use both or either one of the two systems according to the situation. Therefore, the disadvantages of the conventional cutting heads having only one of the automatic and tap-and-go system are eliminated. Moreover, this embodiment makes the head compact by arranging both of the systems along the axis 7a.

Second embodiment

The second embodiment of the present invention is described below with reference to FIGS. 14 through 22. It is noted that in many respects the design is similar to the design described above with reference to the first embodiment. Therefore, the discussion below primarily stresses the differences from the first embodiment.

Figure 14:
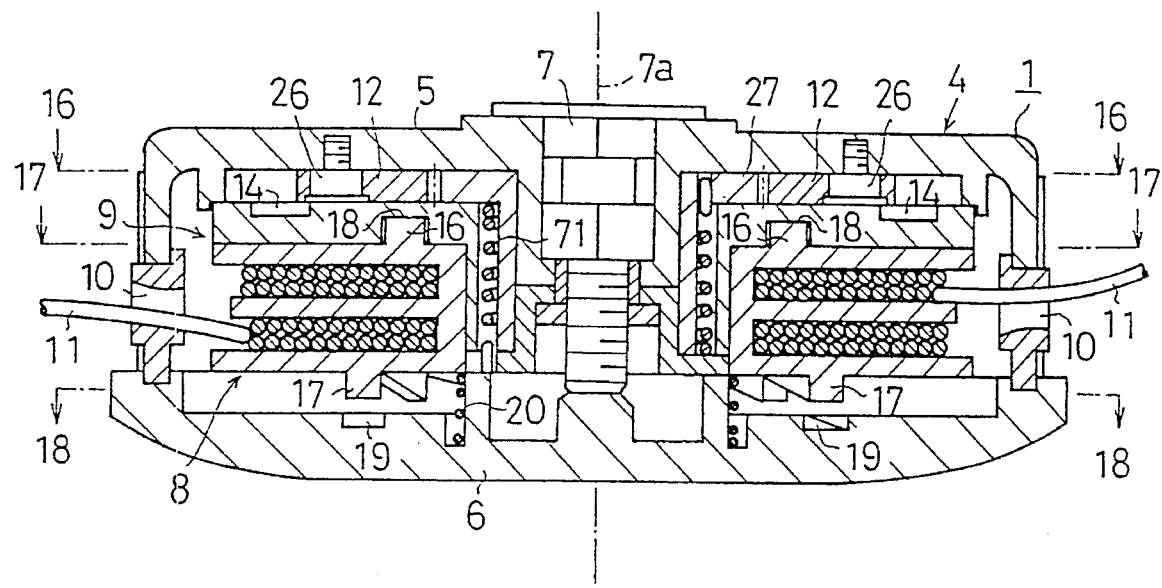
FIGS. 14 through 22 show a second embodiment of the present invention.
Figure 15:
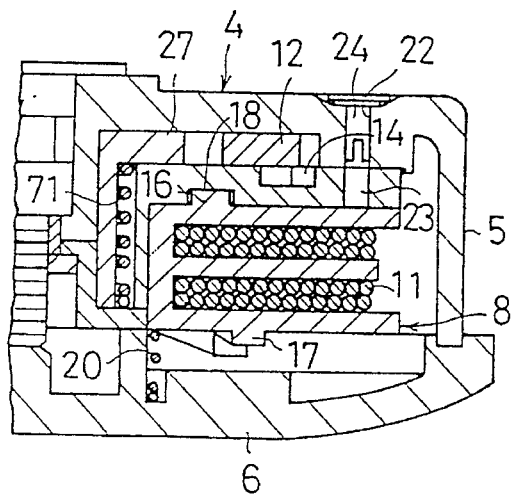
Figure 16:
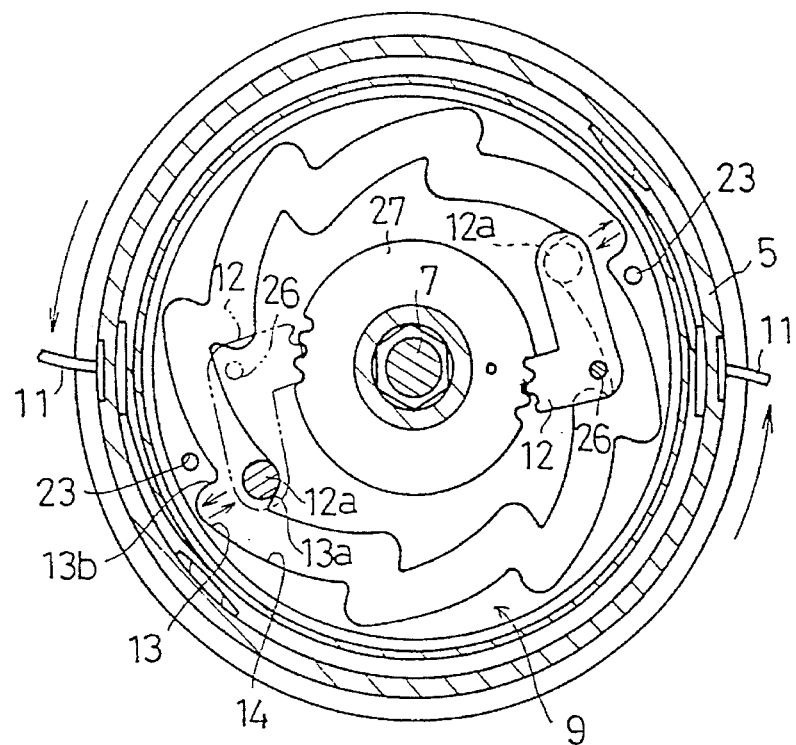
Figure 17:
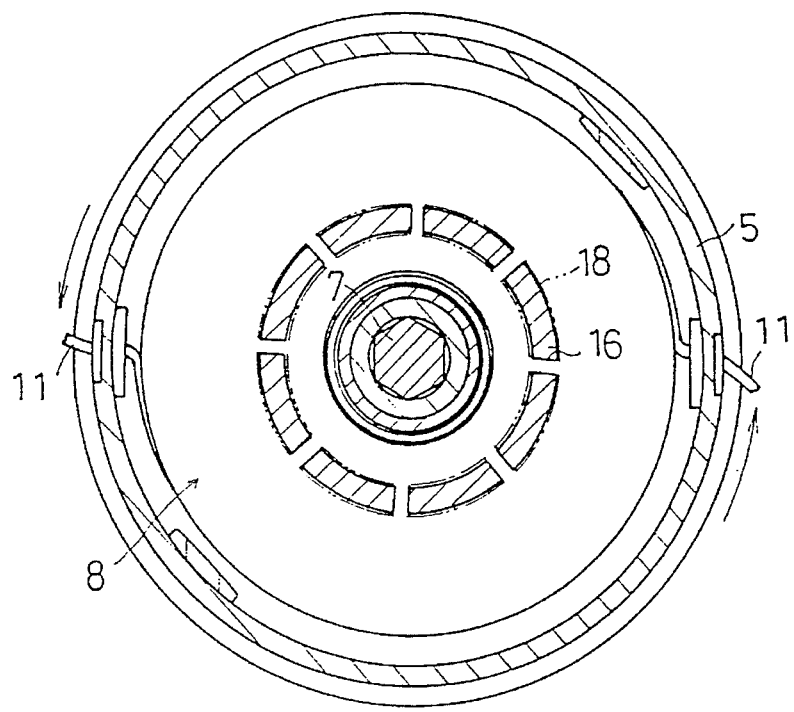
Figure 18:
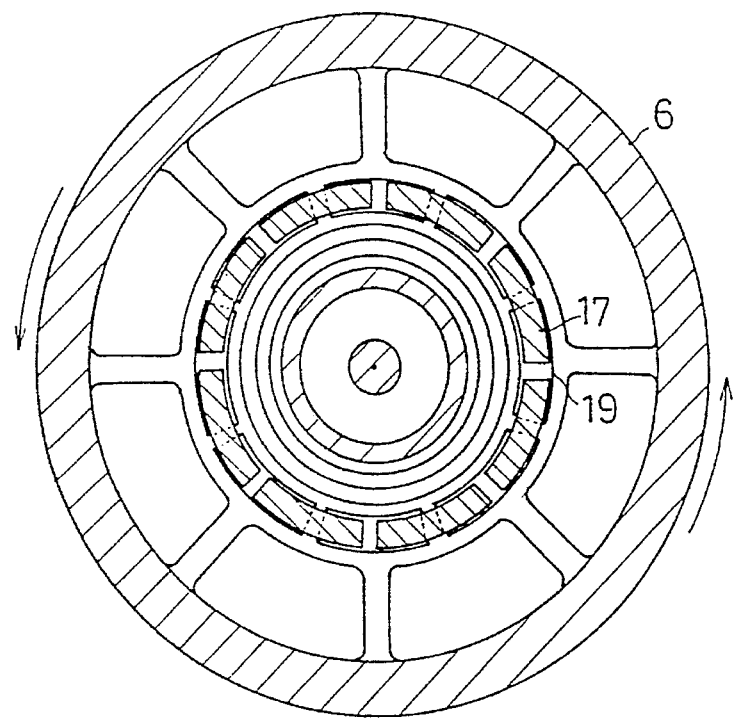
Figure 19:
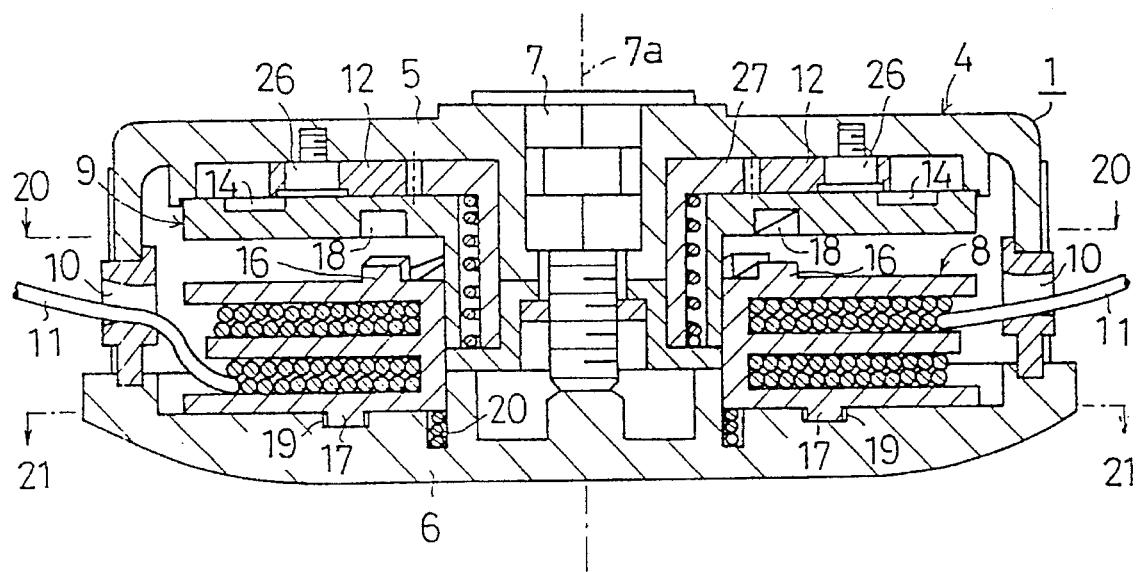
Figure 20:
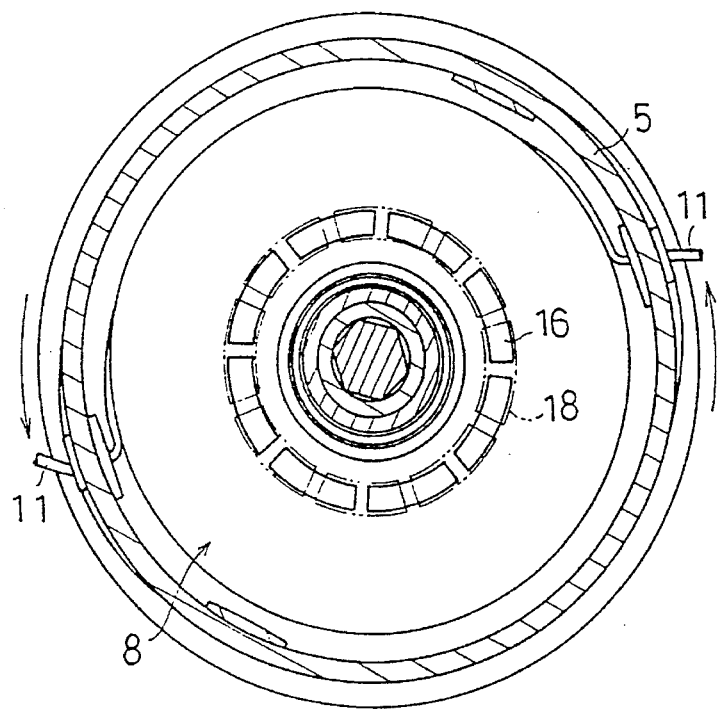
Figure 21:
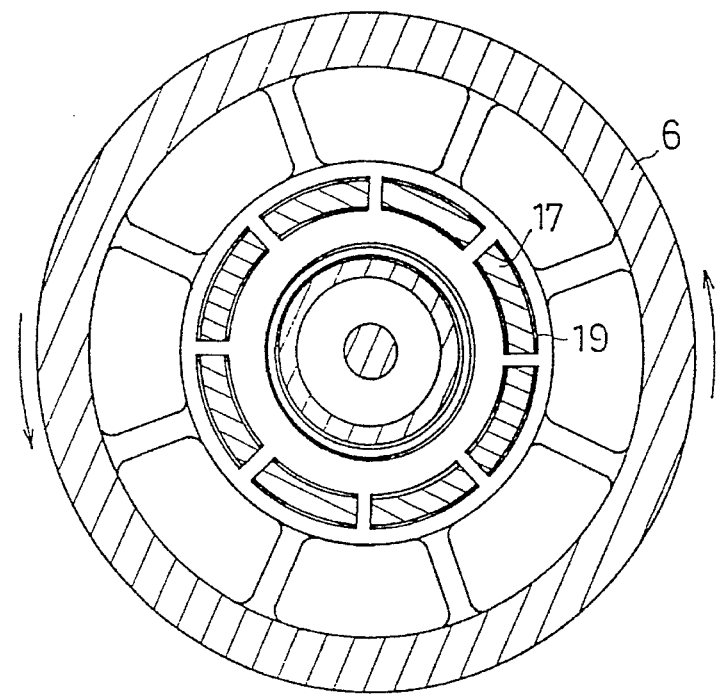
Figure 22:
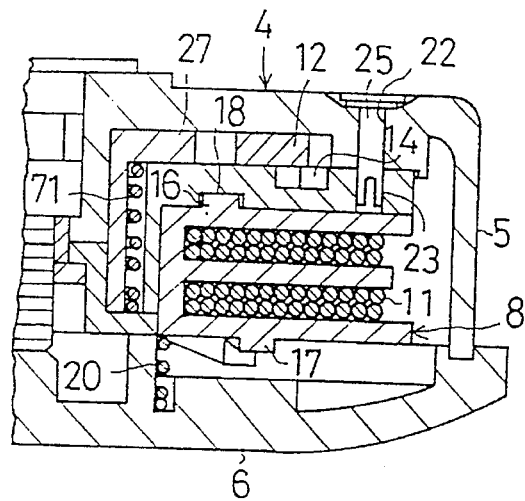

The second embodiment is different from the first embodiment in the construction of a drive link 12 and its urging system. That is, for the second embodiment, just two links 12 are provided. As seen in FIGS. 14 and 16, the links are located 180° apart from each other relative to the housing axis 7a. Each link 12 is rotatably supported on the housing 5 by a pivot pin 26.

A link stud 12a protrudes from the bottom end of each link 12. The stud 12a, similarly to the procedure in the first embodiment, is inserted into a radial groove 13 of a control plate 9. A rotary sleeve 27 is positioned at the center in the housing 5. A torsion coil spring 71 for rotatably urging the sleeve 27 in FIG. 16 is journaled about the sleeve 27.

As shown in FIG. 16, gear type teeth on the link 12 engage similar teeth on the outer periphery of the sleeve 27. Therefore, the studs 12a of the links 12 are urged by the spring 71 such that they press against an associated inner step 13a.

Other portions of the second embodiment are basically the same as those of the first embodiment. Therefore, a portion corresponding to that of the first embodiment is provided with the same number as the first embodiment. FIGS. 14, 15, 16, 17, 18, 19, 20, 21, and 22 of the second embodiment correspond to FIGS. 2, 3, 4, 5, 6, 10, 11, 12, and 13 of the first embodiment respectively.

This construction rotates each link 12 against the action of the spring 71 through the sleeve 27 so that the stud 12a moves outward when the centrifugal force acting on each link 12 increases as the speed of a rotary casing 4 increases. Thus, the stud 12a moves from the stop position to the release position within the radial groove 13.

When cords 11 are extended up to a certain length similarly to procedure in the first embodiment, the speed of the casing 4 decreases and the centrifugal force acting on the link 12 decreases. Therefore, the links 12 are returned by the action of the spring 71. Thus, the automatic feeding of the cords 11 is controlled.

Third embodiment

The third embodiment of the present invention is described with reference to FIGS. 23 through 30. Again the differences from the first embodiment are stressed in the following description.

Figure 23:
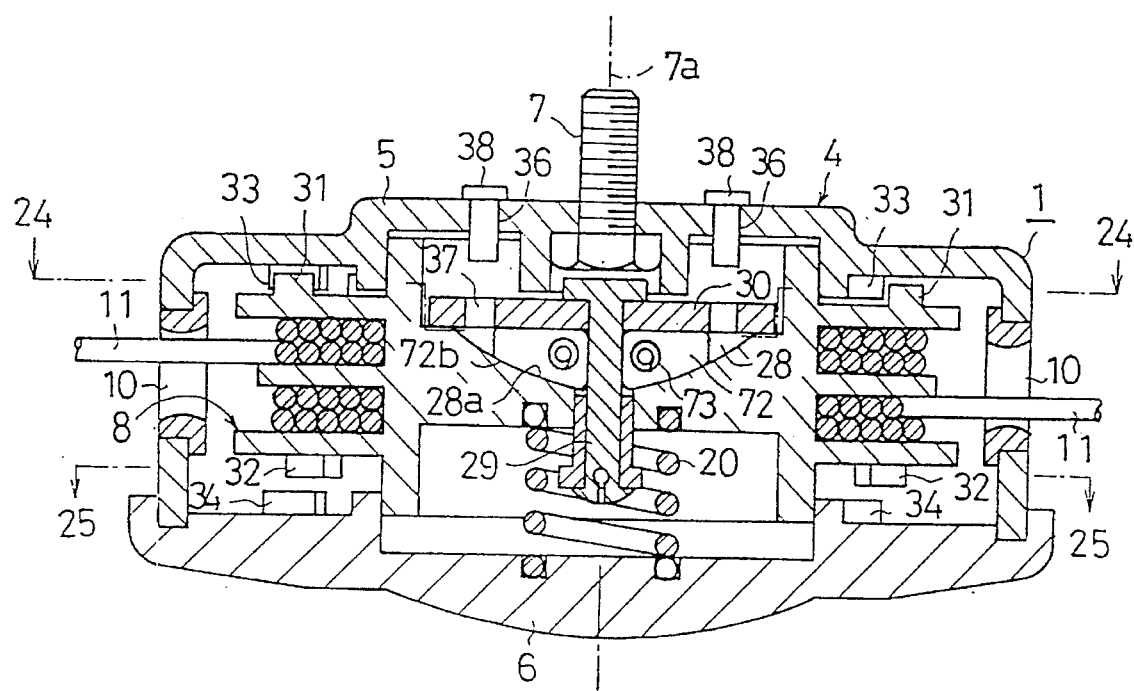
FIGS. 23 through 30 show a third embodiment of the present invention.

As shown in FIG. 23, the third embodiment does not have the control plate 9 used for the first embodiment. Rather a bobbin 8 is located in the casing 4 so that it can rotate relative to the casing 4 around an axis 7a. Because the plate 9 of the first embodiment is not used, the construction of a drive link 12 is also different from that of the first embodiment.

That is, an aperture 28 is formed at the center of the bobbin 8 and the internal surface of the aperture 28 serves as a surface 28a. The surface 28a gradually tilts outward from the axis 7a. A center pin 29 is positioned at the center of the bobbin so that it can be vertically moved. A support plate 30 is mounted to the center pin 29 above the aperture 28.

Figure 24:
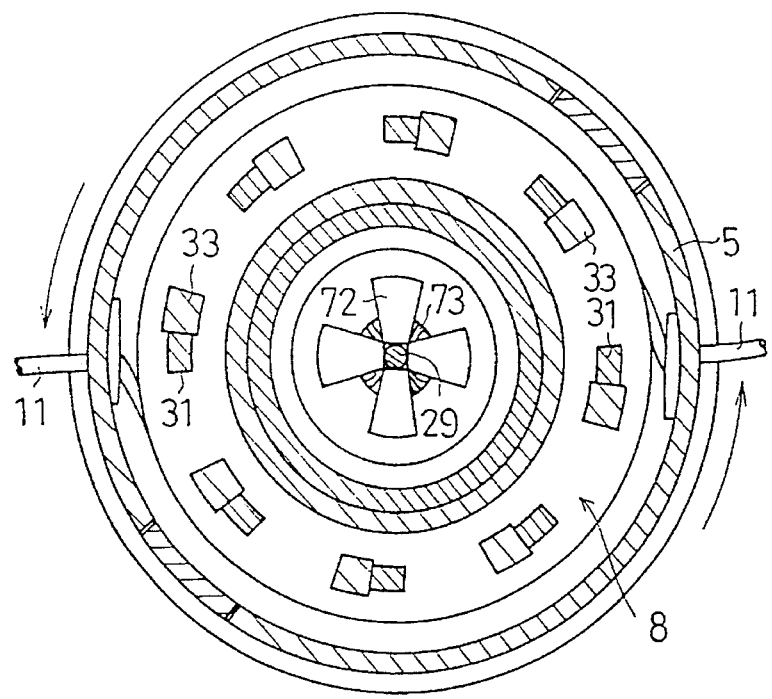

As shown in FIG. 24, four drive links 72 are located between the plate 30 and aperture 28 at 90° intervals so that they surround the center pin 29. The bottom surface 72b of each link 72 extends diagonally. The surface 72b of each link 72 contacts the surface 28a of the aperture 28. Each link 72 is mutually connected by an extension coil spring 73 so that it approaches the center pin 29.

As shown in FIGS. 23 and 24, eight teeth 31 are mounted on the top surface of the bobbin 8 at equally spaced intervals.

Figure 25:
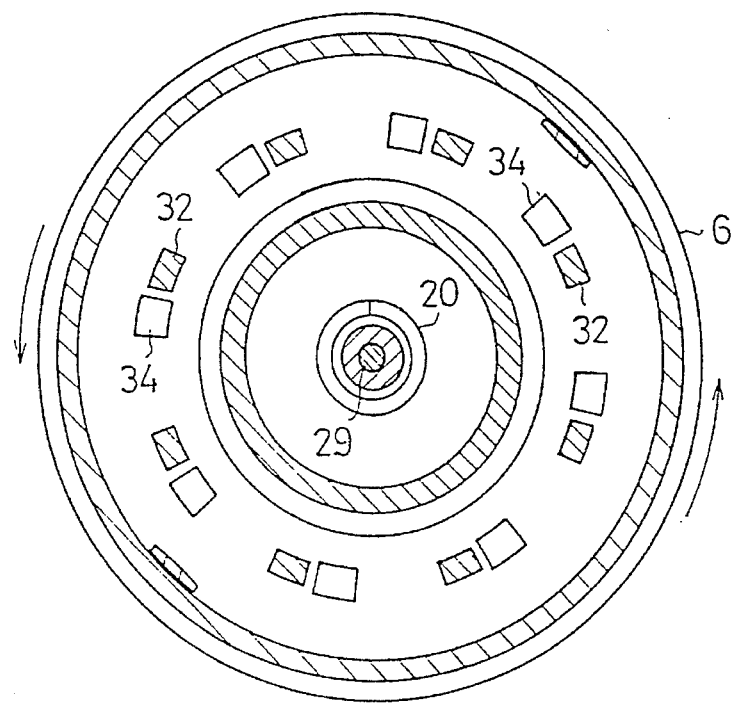

Also, as shown in FIGS. 23 and 25, eight teeth 32 are mounted on the bottom surface of the bobbin 8 at equally spaced intervals. Each top tooth 31 is displaced from each bottom tooth 32 by $2_\pi/16$ radians under the state shown in FIGS. 24 and 25.

Eight teeth 33 are located inside the housing 5 at equally spaced intervals and eight teeth 34 are located on a protective cover 6 at equally spaced intervals. Each tooth 33 of the housing 5 and each tooth 34 of the cover 6 are located at the same angular position.

The bobbin 8 is slidably mounted along the axis 7a and is urged upward by a compression coil spring 20 supported on the cover 6. As shown in FIGS. 23, 24, and 25, the teeth 32 under the bobbin 8 are vertically separated from the teeth 34 of the cover 6 by the action of the spring 20. The spring also urges the teeth 31 above the bobbin 8 to engage with the teeth 33 of the housing 5.

Figure 26:
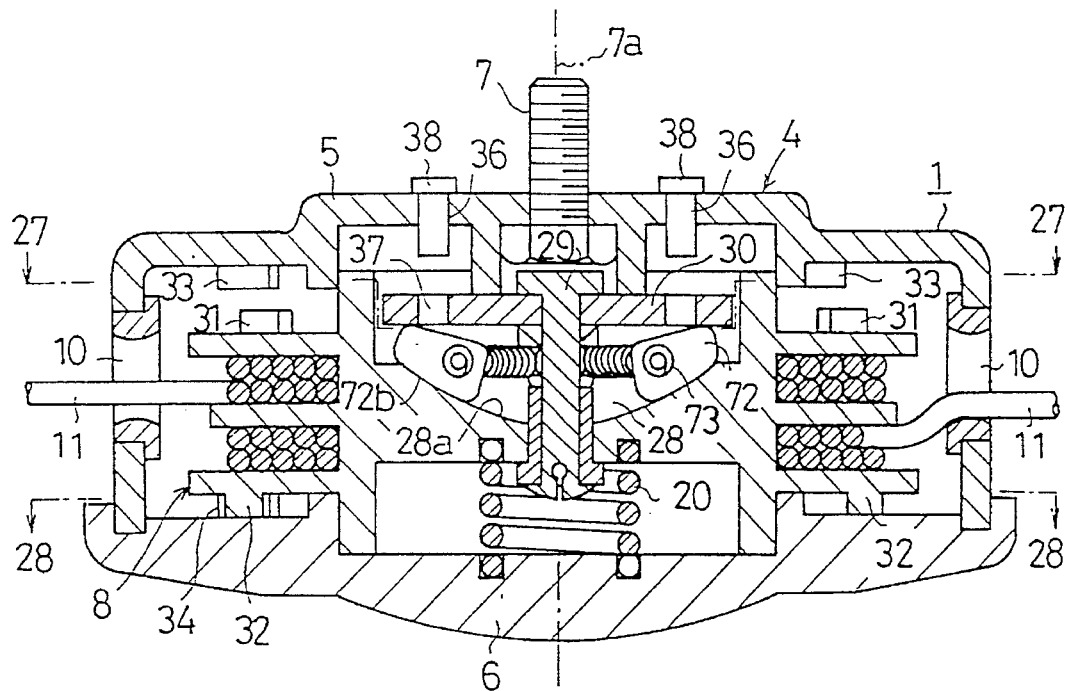
Figure 27:
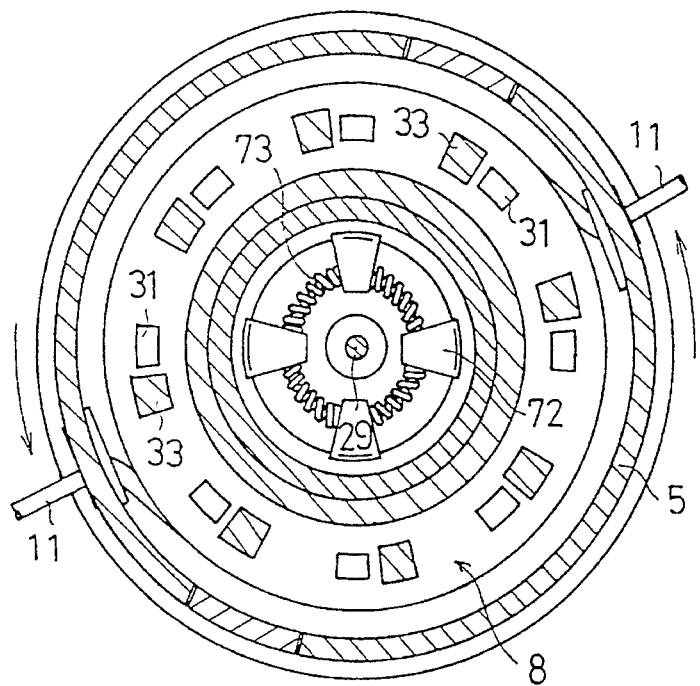
Figure 28:
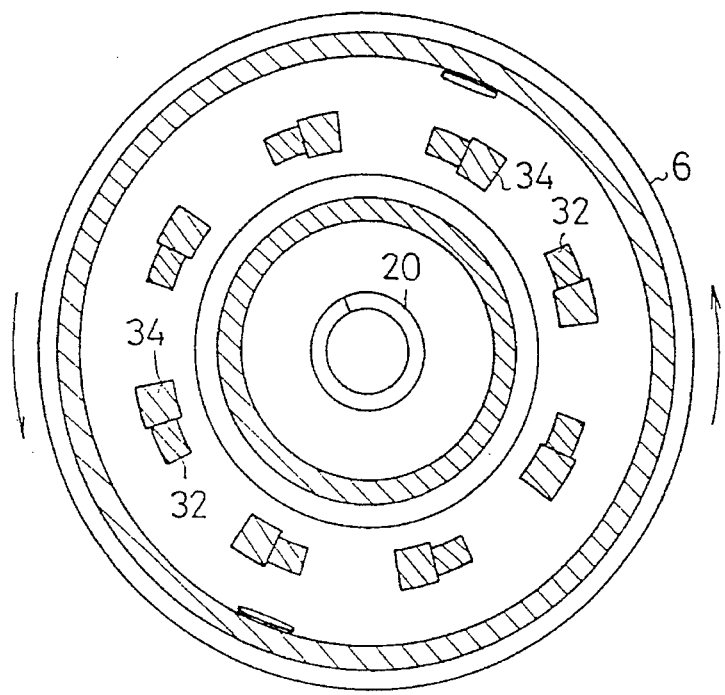

As shown in FIGS. 26, 27, and 28, centrifugal force will urge the links 72 outward from the axis 7a against the action of the spring 73 when the casing 4 rotates. Outward movement of the links presses the bobbin 8 downward. That is the bobbin's aperture surface 28a is pressed downward by the link surfaces 72b. As a result, the bobbin 8 moves downward. When this occurs, the top teeth 31 of the bobbin 8 separates from the teeth 33 of the housing 5 and the bottom teeth 32 of the bobbin 8 engage the teeth 34 of the cover 6.

Figure 29:
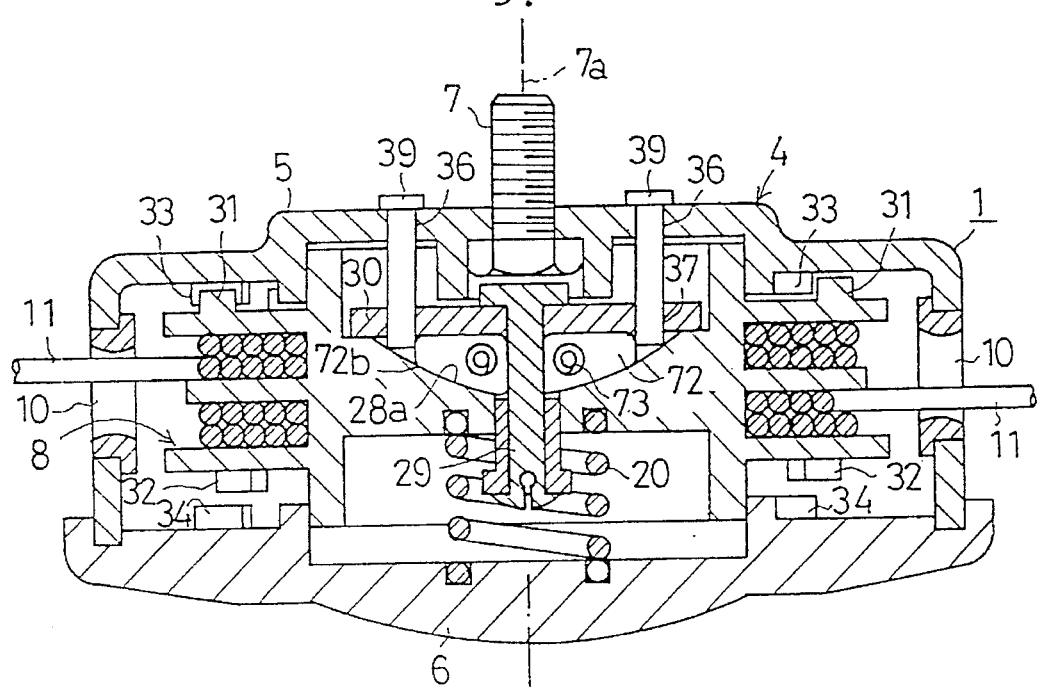
Figure 30:
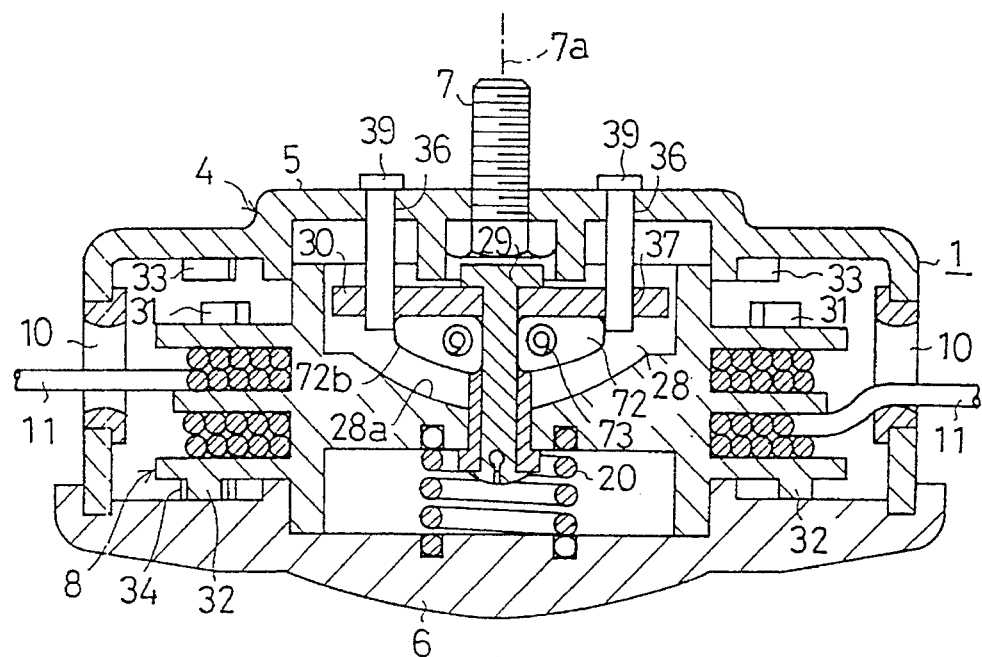

As shown in FIG. 23, four bores 36 are formed on the housing 5 at the intervals of 90°. Four bores 37 are also formed on a support plate 30 at positions corresponding to the bores 36 of the housing 5. Therefore, as shown in FIGS. 23 and 26, when short pins 38 are inserted into the bores 36 of the housing 5, the links 72 are able to move in the radial direction independently of the short pins 38. However, as shown in FIGS. 29 and 30, when stopper pins 39 are inserted into the bores 36 and 37, the bottom end of the stopper pins 39 enter the aperture 28. Therefore, the stopper pins 39 prevent the links 72 from moving radially outward.

As shown in FIG. 23, when the short pins 38 are inserted into only the bores 36 of the housing 5, a cutting head 1 has both the automatic and tap-and-go functions. When the casing 4 under the state shown in FIGS. 23, 24, and 25 rotates, the bobbin 8 also rotates because the teeth 33 of the housing 5 are engaged with the top teeth 31 of the bobbin 8. In this case, a cord 11 extended from a cord feed slot 10 of the casing 4 also rotates to execute mowing.

When the cords 11 are consumed due to mowing, the speed of the casing 4 increases as described in the first embodiment. Thus, the centrifugal force acting on each link 72 increases and the links 72 move radially outward against the spring 73. Thus, the bobbin 8 is pressed downward at surfaces 28a by the links 72.

In this case, as shown in FIGS. 26, 27, and 28, the bobbin 8 moves downward against the action of the spring 20 and rotation of the casing 4 is not transmitted to the bobbin 8 because the top teeth 31 of the bobbin 8 separate from the teeth 33 of the housing 5. Thus, the bobbin 8 slips relative to the casing 4, and the cord 11 is extended outward from the slot 10 by the length corresponding to the difference of rotational angle between the casing 4 and the bobbin 8, similarly to the first embodiment.

When the casing 4 slips by approximately $2_\pi/16$ radians relatively to the bobbin 8, the bottom teeth 32 of the bobbin 8 are engaged with the teeth 34 of the cover 6 and the bobbin 8 rotates again by following the casing 4. However, when the rotational resistance of the casing 4 increases after the cord 11 is extended, the speed of the casing 4 decreases. Accordingly, the centrifugal force acting on each link 72 also decreases and the links 72 are returned toward the axis 7a by the action of the spring 73. Accordingly, the bobbin 8 is raised by the action of the spring 20 and the bottom teeth 32 of the bobbin 8 separate from the teeth 34 of the cover 6. As a result, rotation of the casing 4 is not transmitted to the bobbin 8.

Then, the bobbin 8 slips relative to the casing 4, while, as described above, the cords 11 are extended outward by the length corresponding to the difference of rotational angle between the casing 4 and the bobbin 8. When the casing 4 slips by approximately $2_\pi/16$ radians relatively to the bobbin 8, the top teeth 31 of the bobbin 8 engage with the teeth 33 of the housing 5 and the bobbin 8 rotates again together with the casing 4.

In accordance with this embodiment, when the cords 11 wears off by a certain length, they are automatically fed by a length corresponding to $4_\pi/16$ radians each time the bobbin 8 vertically reciprocates.

The following is the description for use of the tap-and-go system. When the casing 4 under the state shown in FIGS. 23, 24, and 25 is hit against the ground, the bobbin 8 is moved downward by the hitting impact against the spring 20 as shown in FIG. 26. Thus, the cords 11 are fed similarly to the procedure in the automatic system. The spring 20 is compressed as the bobbin 8 is lowered due to the hitting operation. When the inertia of the bobbin is absorbed, the bobbin 8 is pushed upward due to the action of the spring 20 and the cords 11 are fed similarly to the procedure in the automatic system.

Thus, the head 1 of this embodiment makes it possible to set the length of the cord 11 longer than the extending length set by the automatic system by hitting the casing 4 against the ground as desired.

In another mode shown in FIGS. 29 and 30, the stopper pins 39 are inserted into the housing 5. In this mode, the links 12 cannot move and the cords 11 can not be automatically extended. Therefore, in this case, only the tap-and-go system operates similarly to the procedure in the first embodiment.

Fourth embodiment

The fourth embodiment of the present invention is described below with reference to FIGS. 31 through 39. Again the differences from the first embodiment are stressed.

In the first embodiment, the bobbin 8 and the plate 9 are rotatably supported independently of the casing 4. In contrast, in the fourth embodiment, the bobbin 8 always rotates together with a protective cover 6 as shown in FIG. 31.

A shifter 40 is set between the bobbin 8 and a control plate 9. The shifter 40 rotates relatively to a rotary casing 4. A pair of cord feed slots 10 are provided on the outer periphery of the shifter 40 and are spaced apart by an interval of 180°. The end of a cord 11 passes through the slots 10 and extends beyond a housing 5.

Figure 31:
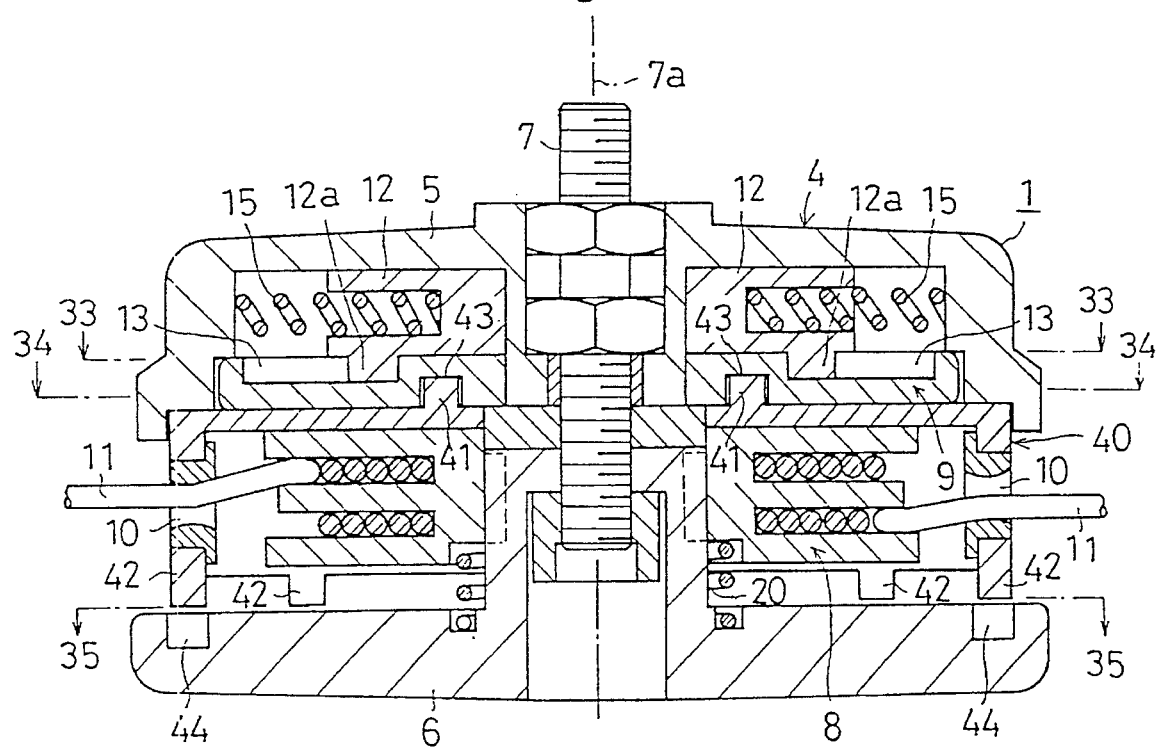
FIGS. 31 through 39 show a fourth embodiment of the present invention.
Figure 34:
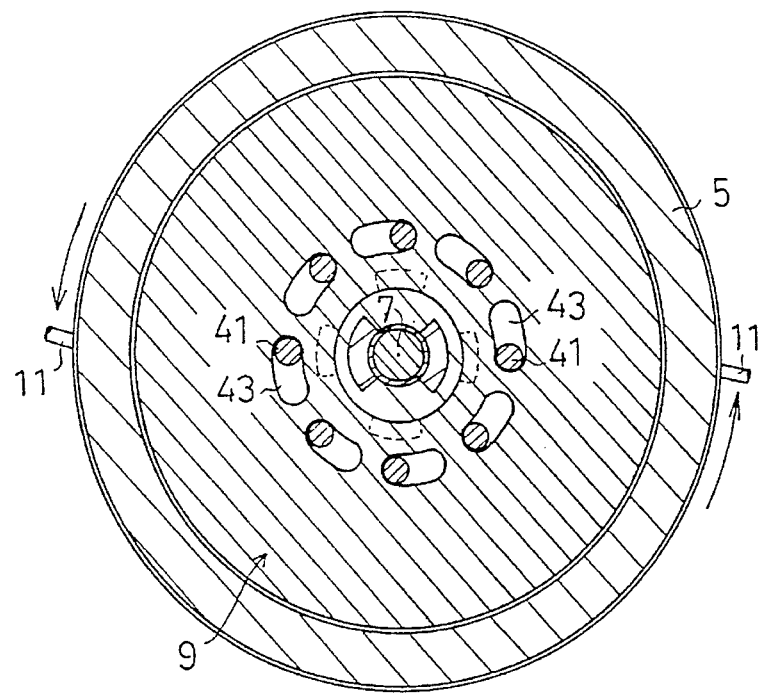
Figure 35:
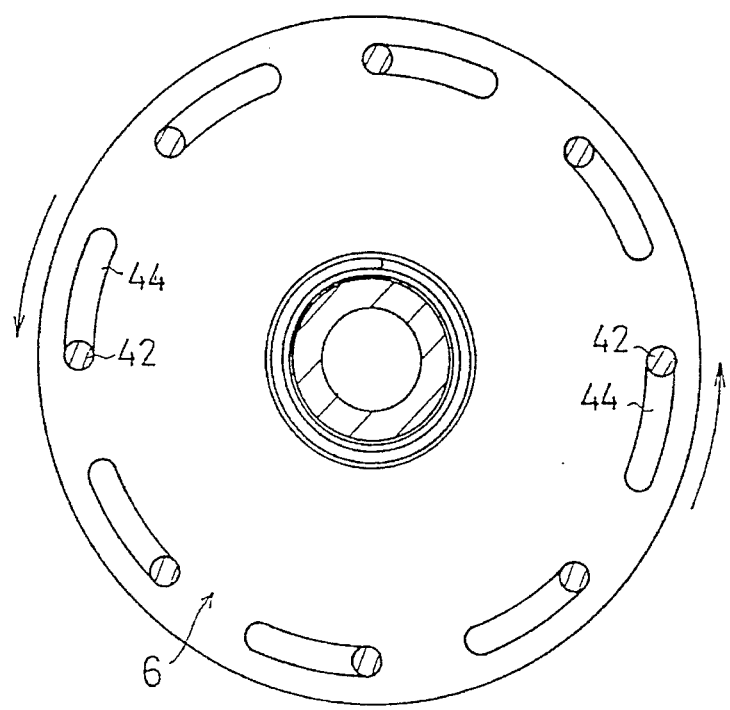

As shown in FIGS. 31 and 34, eight projections 41 are provided on the top surface of the shifter 40 along the periphery at equally spaced intervals. As shown in FIGS. 31 and 35, eight projections 42 provided on the bottom surface of the shifter 40 along its periphery at equally spaced intervals. Each top projection 41 and each bottom projection 42 are located at the same angular position.

Eight recesses 43 are provided on the bottom surface of the plate 9 at equally spaced intervals. Eight recesses 44 are provided on the upper surface of the cover 6 at equally spaced intervals. In the state shown in FIGS. 34 and 35, each recess 43 of the plate 9 is displaced from each recess 44 of the cover 6 by $2_\pi/16$ radians in the circumferential direction.

The bobbin 8 and the shifter 40 are slidable along an axis 7a and urged upward by a compression coil spring 20 supported by the cover 6.

Figure 36:
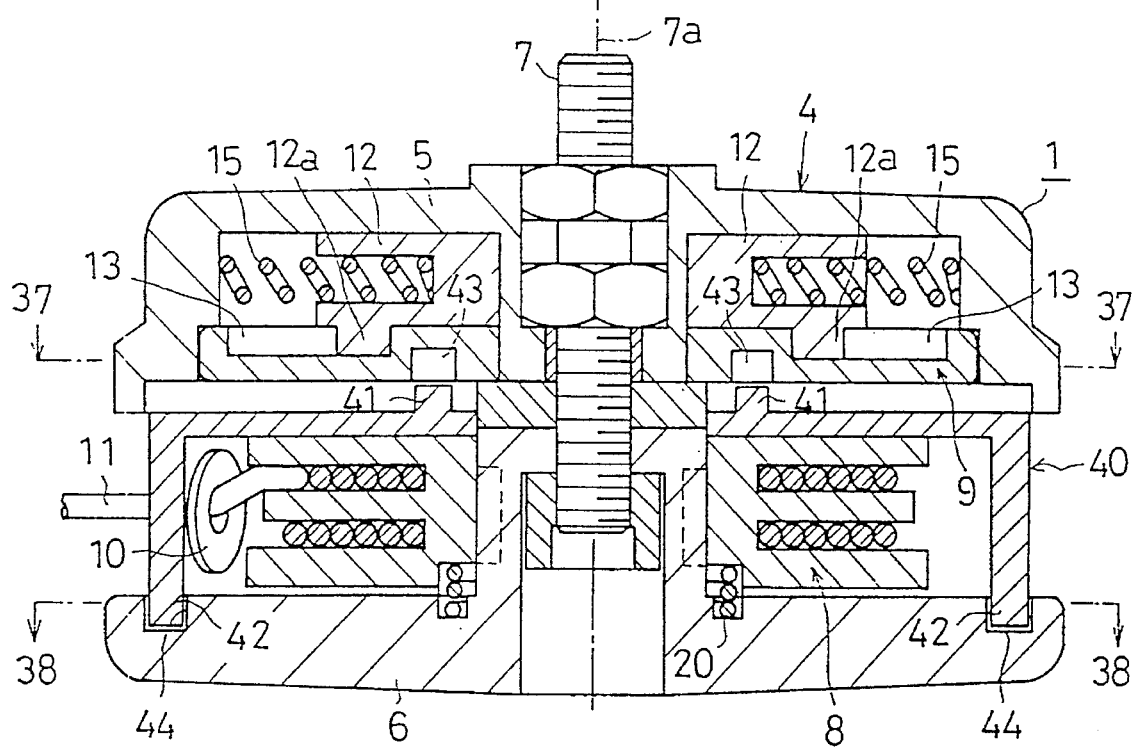
Figure 37:
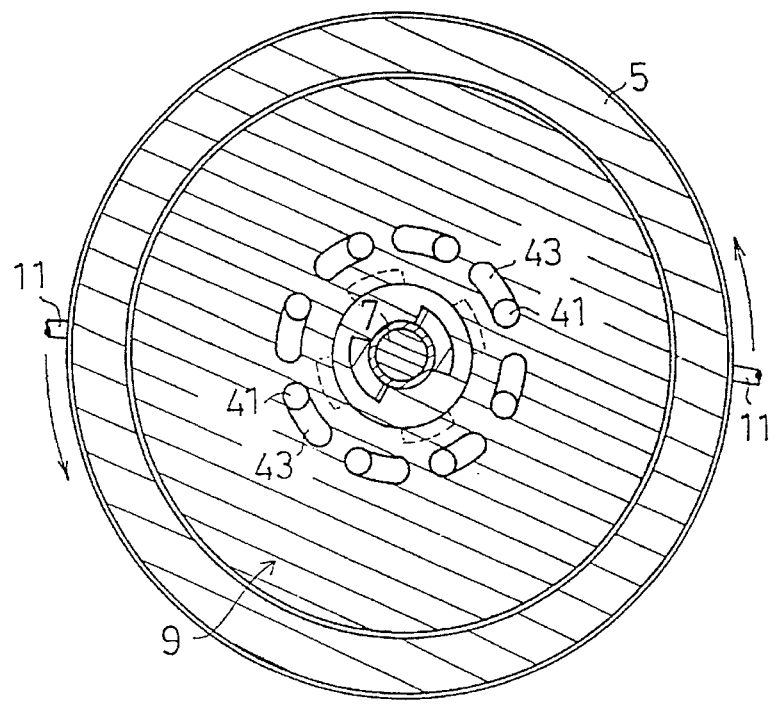
Figure 38:
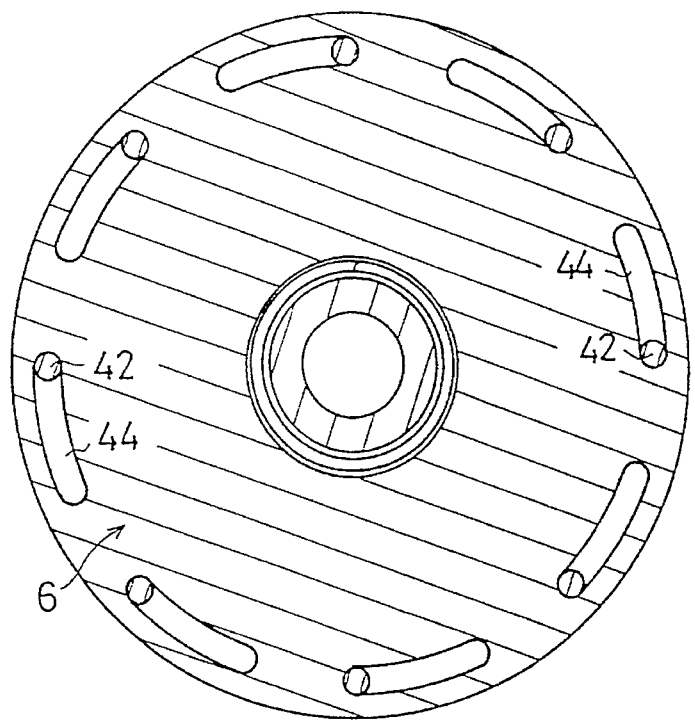

As shown in FIGS. 31, 34, and 35, the top projections 41 of the shifter 40 are received by the recesses 43 of the plate 9 and the bottom projections 42 of the shifter 40 are separated the corresponding recesses 44 of the cover 6 by the action of the spring 20 respectively. FIGS. 36, 37, and 38 show the state in which the bobbin 8 and the shifter 40 move downward against the action of the spring 20. In this case, the bottom projections 42 are received by the cover recesses 44 and the top projections 41 are spaced from the plate recesses 43.

Figure 32:
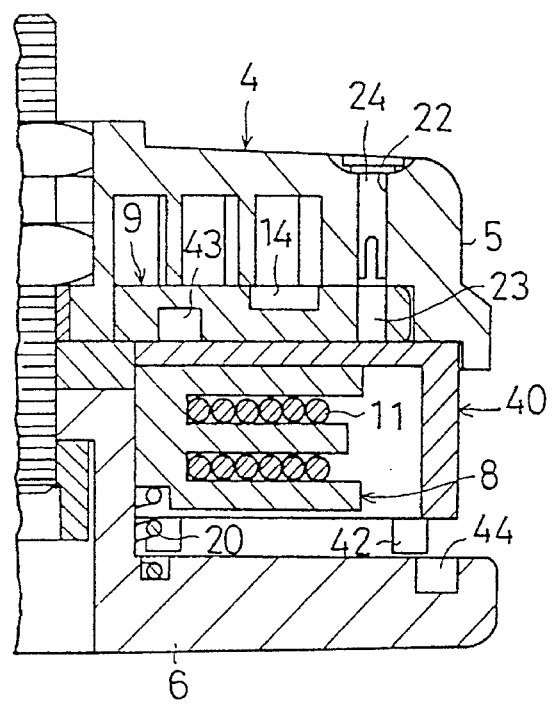
Figure 33:
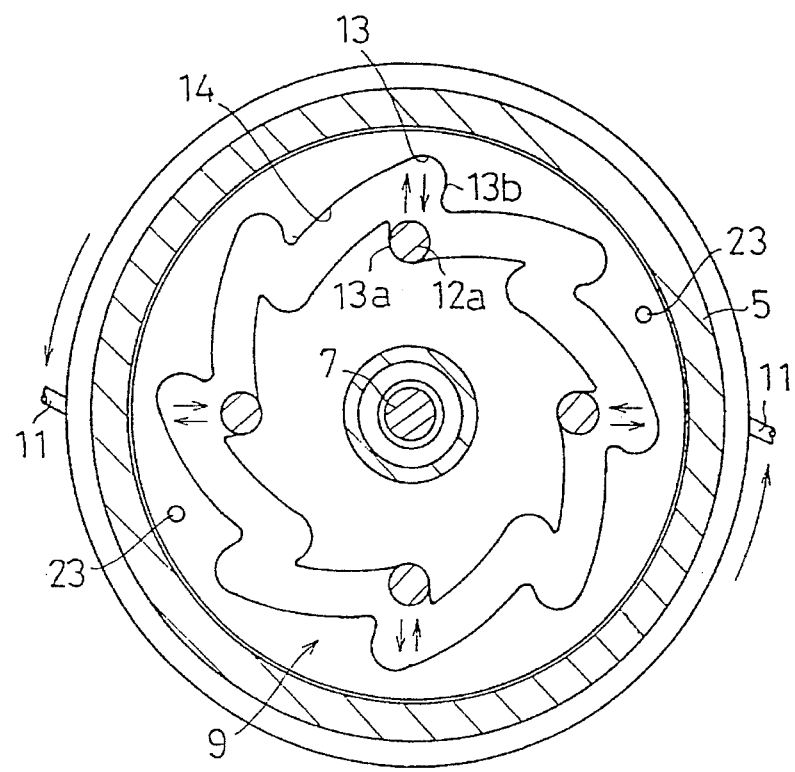

As shown in FIG. 32, when a short pin 24 is inserted into only a bore 22 of the housing 5, a cutting head 1 has both the automatic and tap-and-go functions. In this case, the casing 4 under the state shown in FIGS. 31 and 33 rotates together with the bobbin 8. The plate 9 is rotated due to engagement with link studs 12a of drive links 12. Moreover, the shifter 40 is rotated due to engagement between the plate recesses 43 and the top projections 41 of the shifter 40. In this case, the cords 11 also rotates to cut grass.

When the cords 11 are worn off due to mowing, the speed of the casing 4 increases and the centrifugal force acting on the links 12 increases, similarly to the situation described in the first embodiment. Accordingly, the links 12 separate from the axis 7a against a compression coil spring 15 and the projection 12a of each link 12 moves from a stop position to a release position in their radial groove 13 of the plate 9.

In the above state, the rotation of the casing 4 is not transmitted to the plate 9. Therefore, the shifter 40 slips relative to the casing 40 as the casing 4 rotates. Because the bobbin 8 rotates together with the casing 4, the cords 11 extend beyond the casing 4 by the length corresponding to the difference of rotational angle between the shifter 40 and the casing 4 (or bobbin 8).

When the bobbin 8 slips by approximately $2_\pi/8$ radians relative to the shifter 40 and the cords 11 are extended, the speed of the casing 4 decreases in a manner similar to the situation described in the first embodiment. Accordingly, the centrifugal force acting on the link 12 decreases and the link 12 returns toward the axis 7a due to the action of the spring 15. Thus, each projection 12a reaches a stop position of the adjacent slide groove 13, and the plate 9 and the shifter 40 rotate again together with the casing 4 and the bobbin 8.

As described above, the head 1 of this embodiment is similar to that described in the first embodiment in that it automatically feeds the cords 11 by a predetermined length when they are worn to a predetermined length.

The following is the description of the use of the tap-and-go system. When the casing 4 in the state shown in FIGS. 31, 34, and 35 is hit against the ground, the bobbin 8 and the shifter 40 move downward against the action of the spring 20. Then, the bottom projections 42 of the shifter 40 are inserted into the recesses 44 of the cover 6.

When the casing 4, bobbin 8, and plate 9 rotate by approximately $2_\pi/16$ radians relative to the shifter 40, the bottom projections 42 of the shifter 40 engage the recesses 44 of the cover 6. Then, the shifter 40 rotates again together with the casing 4, bobbin 8, and plate 9. Therefore, the cords 11 are fed by the length corresponding to the difference of rotational angle between the shifter 40 and the casing 4.

Once the downward inertia of the bobbin 8 and the shifter 40 has been overcome by the compression of spring 20 the bobbin 8 and the shifter 40 are moved upward by the action of the spring 20. As the shifter 40 moves upward, the top projections 41 of the shifter 40 are inserted into the recesses 43 of the plate 9.

When the casing 4, bobbin 8, and plate 9 slip by approximately $2_\pi/16$ radians relative to the shifter 40, the cords 11 are extended by the length corresponding to the difference of rotational angle between the shifter 40 and the casing 4 as mentioned above. When the top shifter projections 41 engage with the plate recesses 43, the shifter 40 rotates again together with the casing 4 and the plate 9. Thus, the fourth embodiment allows the operator to set the length of the cord 11 longer than the extending length set by the automatic system by hitting the casing 4 against the ground as desired.

Figure 39:
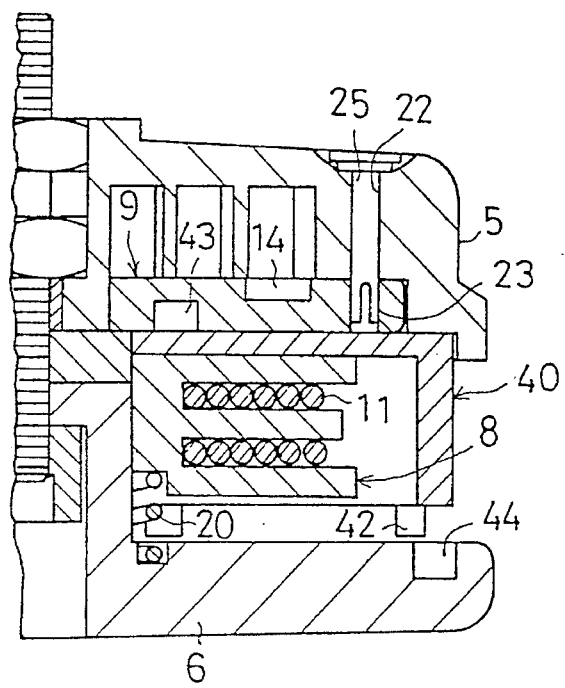

In the mode shown in FIG. 39, when stopper pins 25 are inserted into the bores 22 of the housing 5 and the bores 23 of the plate 9, automatic feed of the cord 11 is prohibited and only the tap-and-go system operates, similarly to the situation described in the first embodiment.

Fifth embodiment

The fifth embodiment of the present invention is described below with reference to FIGS. 40 through 49. Again the differences from the first embodiment are stressed.

Figure 40:
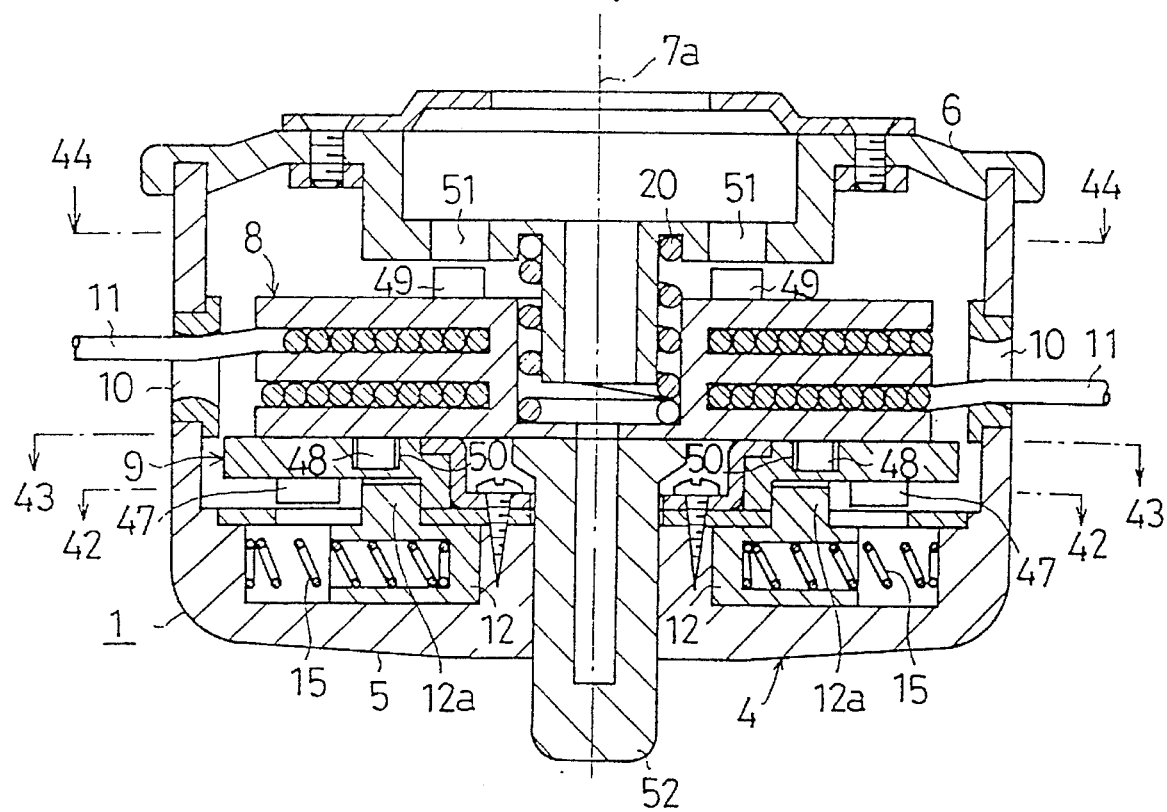
FIGS. 40 through 49 show a fifth embodiment of the present invention.

For the fifth embodiment, a housing 5 and a protective cover 6 which constitute a rotary casing 4 are assembled inversely to those of the first embodiment as shown in FIG. 40. Therefore, a shaft tube 2 is mounted on the cover 6. Accordingly, the positions of a bobbin 8, a control plate 9, and each drive link 12 are changed.

Figure 41:
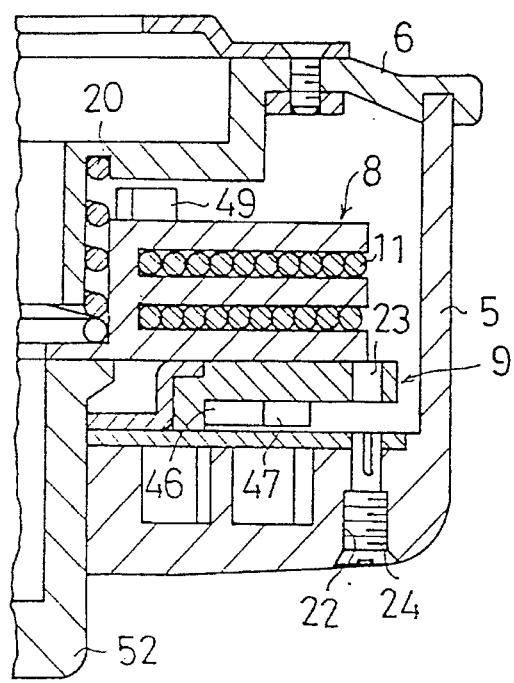
Figure 42:
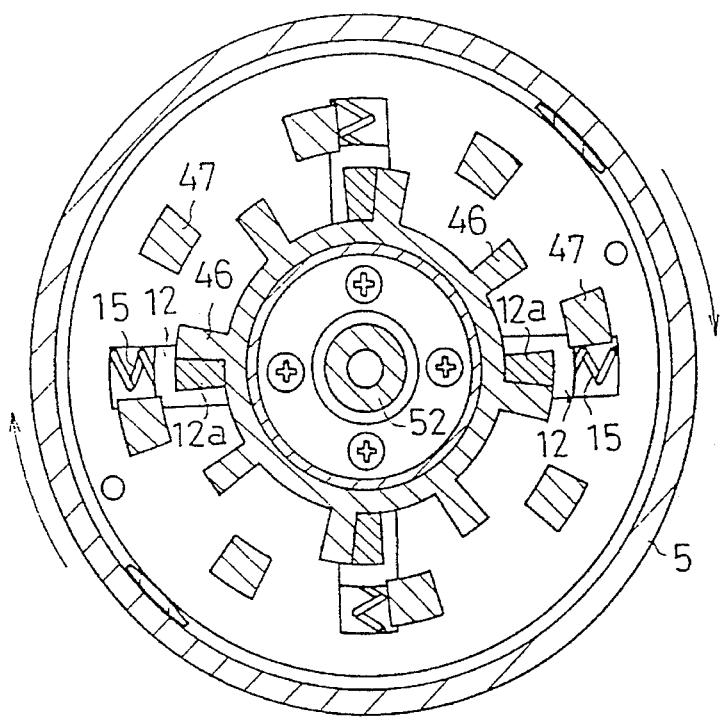

As shown in FIGS. 41 and 42, eight teeth 46 are provided on the bottom surface of the plate 9 at equally spaced intervals. Eight teeth 47 are also provided on the bottom surface of the plate 9 at equally spaced intervals. The teeth 46 and the teeth 47 are displaced from each other by $2_\pi/16$ radians.

Each drive link 12 is urged toward an axis 7a by a compression coil spring 15 and the link stud 12a of each link 12 is ready to engage with the inside teeth 46 of the plate 9. When the casing 4 rotates, the plate 9 also rotates in the same direction as the casing 4 due to engagement between the studs 12a and the inside teeth 46 of the plate 9.

Figure 46:
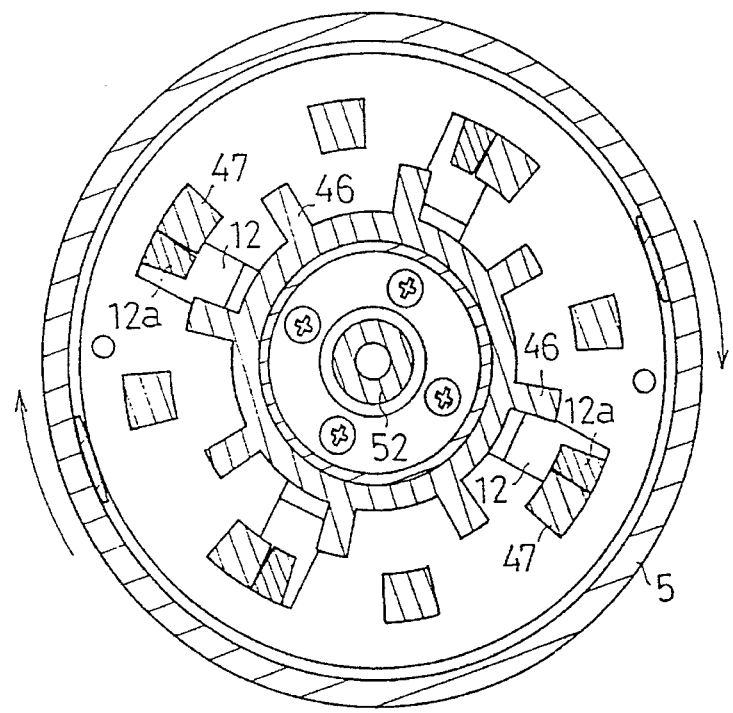

As shown in FIG. 46, when the links 12 move radially outward from the axis 7a against the action of the spring 15, the studs 12a separate from the inside teeth 46 of the plate 9 and such that then can engage the outside teeth 47 of the plate 9.

Figure 43:
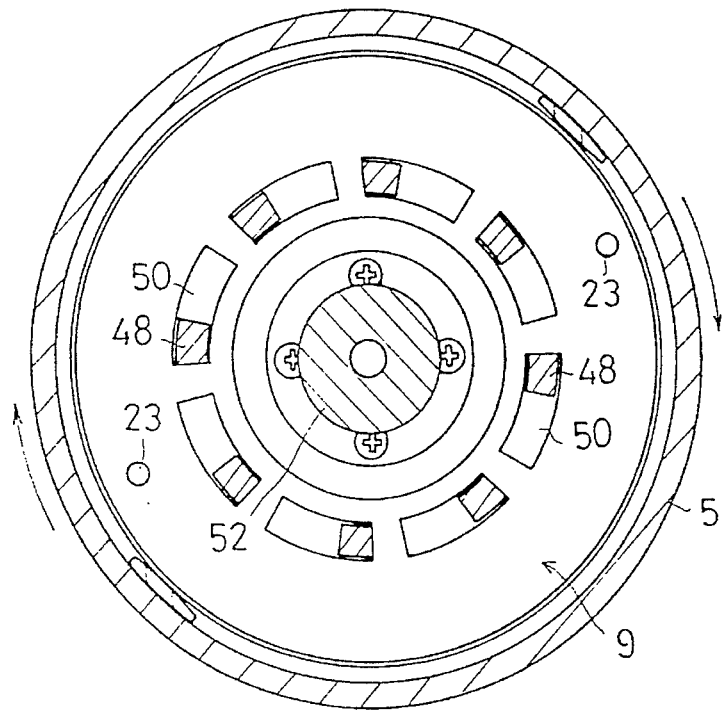
Figure 44:
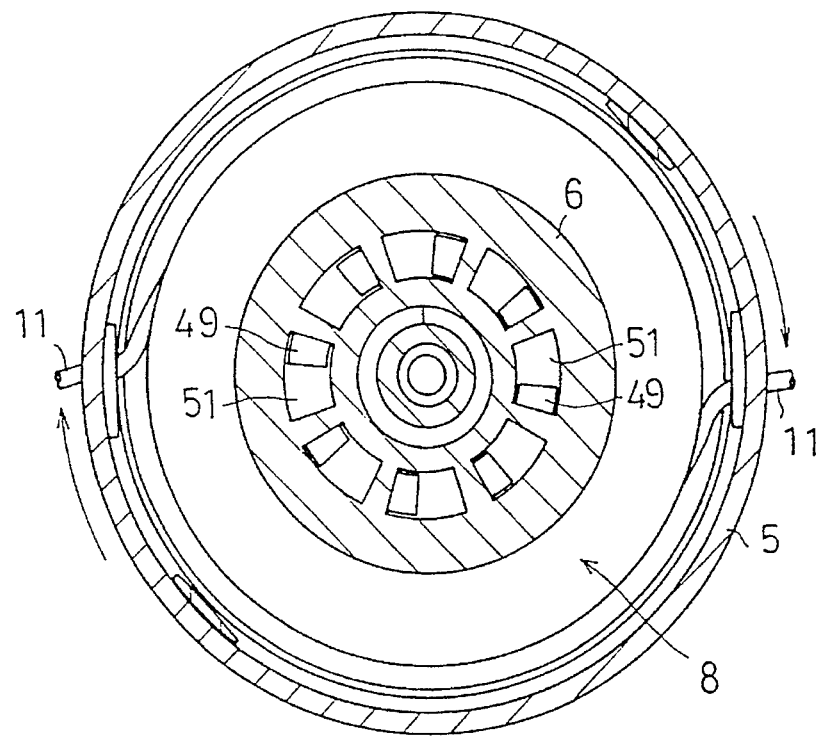

As shown in FIGS. 40 and 43, eight teeth 48 are provided on the bottom surface of a bobbin 8 at equally spaced intervals. As shown in FIGS. 40 and 44, eight teeth 49 are provided on the top surface of the bobbin 8 at equally spaced intervals. The bottom teeth 48 and the top teeth 49 are located at the same angular positions.

Eight recesses 50 are formed on the top surface of the plate 9 at equally spaced intervals. Eight holes 51 are formed on the top wall of the cover 6 at equally spaced intervals. Under the state shown in FIGS. 43 and 44, the recesses 50 of the plate 9 and the holes 51 of the cover 6 are displaced by $2_\pi/16$ radians.

As shown in FIG. 40, a center boss 52 is mounted at the center of the bottom surface of the bobbin 8, which is exposed to the outside through the center of the housing 5. The bobbin 8 and the boss 52 are supported so that they can move along the axis 7a and are urged downward by the spring 20. By the action of the spring 20, the top teeth 49 of the bobbin 8 separate from the cover holes 51 and the bottom teeth 48 of the bobbin 8 are inserted into the plate recesses 50.

Figure 45:
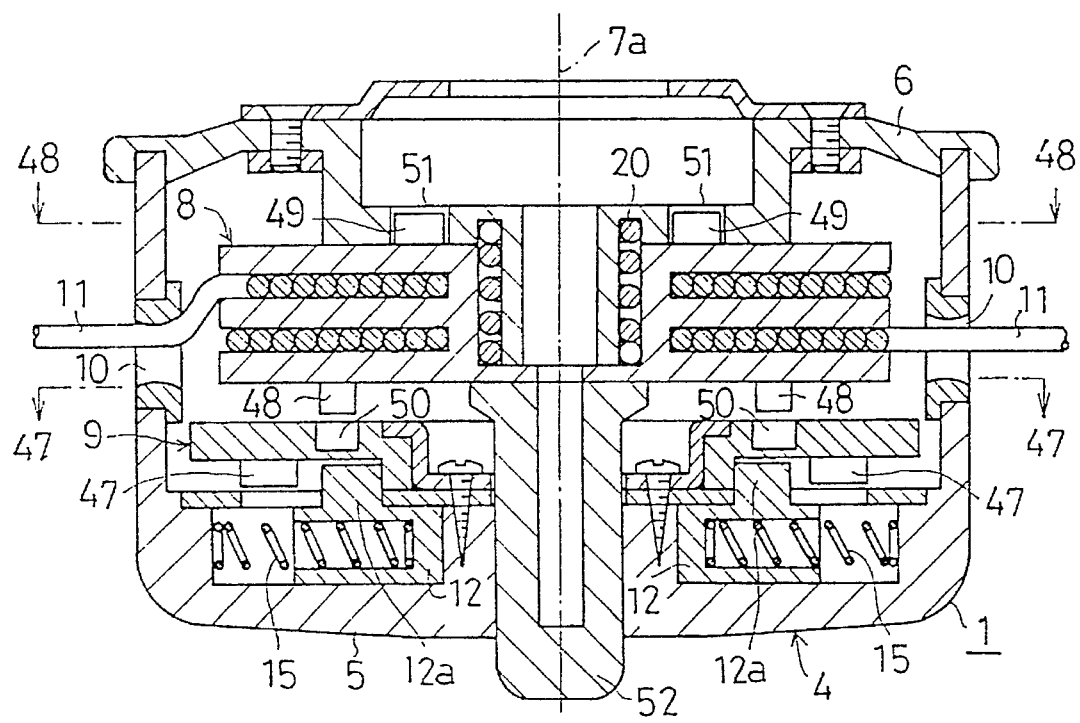
Figure 47:
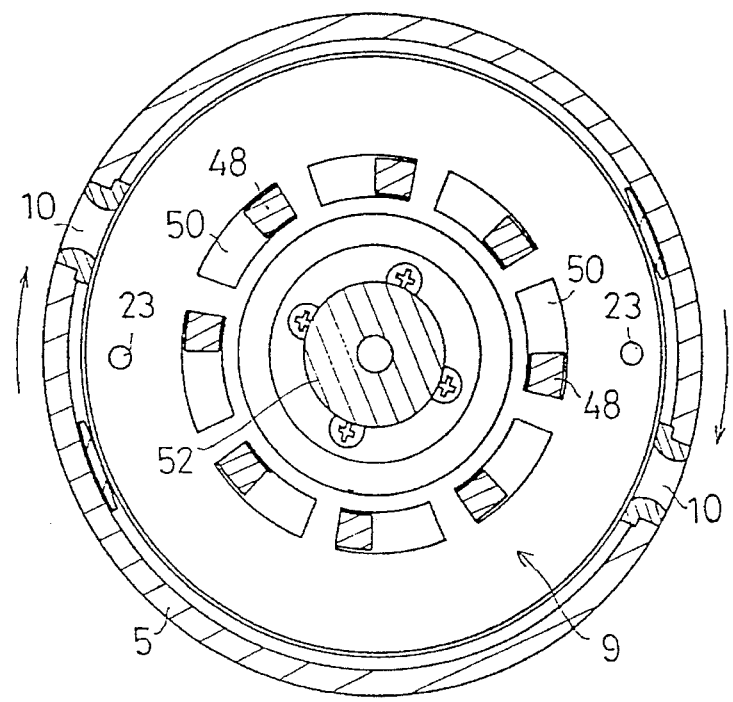
Figure 48:
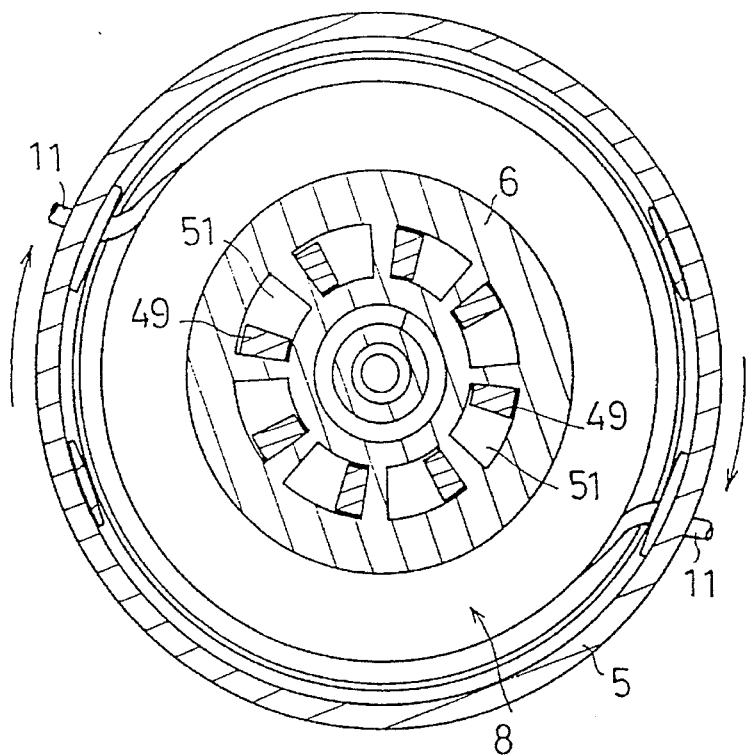

As shown in FIGS. 45, 47 and 48, when the bobbin 8 and the boss 52 are moved upward against the action of the spring 20, the bottom teeth of the bobbin 8 separate from the recesses 50 of the plate 9 and the top teeth of the bobbin 8 are inserted into the holes 51 of the cover 6.

As shown in FIG. 41, when short pins 24 are inserted into the bores 22 of the housing 5, the cutting head 1 has both automatic and tap-and-go functions. In this case, when the casing 4 under the state shown in FIGS. 40 and 42 rotates, the plate 9 is rotated due to engagement between the link studs 12a and the inside teeth 46 of the plate 9. Moreover, the bobbin 8 is rotated due to engagement between the plate recesses 50 and the bottom teeth 48 of the bobbin 8. The cords 11 rotate together with the casing 4 and the bobbin 8.

When the cords 11 are worn due to mowing, the centrifugal force acting on each link 12 increases similarly to the situation described in the first embodiment. Then, the links 12 separate from the axis 7a against the spring 15 and the link stud 12a separates from the inside teeth 46 of the plate 9 to enter the rotational route of the outside teeth 47.

When the link studs 12a are not engaged with the inside teeth 46 of the plate 9, rotation of the casing 4 is not transmitted to the plate 9. Therefore, the bobbin 8 and the boss 52 slip relative to the casing 4. Then, the cords 11 are extended outward due to the centrifugal force while the difference of rotational speed occurs between the plate 9, bobbin 8, and boss 52 on one hand and the casing 4 on the other.

When the casing 4 slips by approximately $2_\pi/16$ radians relatively to the bobbin 8, the link stud 12a engage the outside teeth 47 of the plate 9. Thus, the plate 9, bobbin 8, and boss 52 rotate again together with the casing 4.

When the cords 11 are fed by a designated length, the speed of the casing 4 decreases and the centrifugal force acting on each link 12 also decreases. Then, each link 12 is moved toward the axis 7a by the action of the spring 15. As a result, the stud 12a of each link 12 separates from the outside teeth 47 of the plate 9 and enters the rotational route of the inside teeth 46 of the plate 9.

As above mentioned, when the link studs 12a are not engaged with the outside teeth 47 of the plate 9, rotation of the casing 4 is not transmitted to the plate 9. Therefore, the bobbin 8 and the boss 52 slip. Thus, while the difference of rotational speed occurs between the plate 9, bobbin 8, and boss 52 on one hand and the casing 4 on the other, the cords 11 are extended outward by the centrifugal force.

When the casing 4 slips by approximately $2_\pi/16$ radians relatively to the bobbin 8, the link studs 12a engage with the inside teeth 46 of the bobbin 8, and the plate 9. At that point, bobbin 8 and boss 52 rotate together with the casing 4. Therefore, this embodiment automatically feeds the cords 11 of a certain length by repeating the operation previously mentioned when the cords 11 wear off by a certain length.

The following is the description for use of the tap-and-go system. When the boss 52 of the head 1 under the state in FIGS. 40, 43, and 44 is hit against the ground, the boss 52 moves upward together with the bobbin 8 against the action of the spring 20. Then the top bobbin teeth 49 are inserted into the cover holes 51 as shown in FIGS. 45, 47, and 48. At this point casing 4 slips relative to the bobbin 8 and boss 52 by approximately $2_\pi/16$ radians. Accordingly, the top bobbin teeth 49 engage the cover holes 51, and the bobbin 8 and boss 52 rotate together with the casing 4. Thus, like in the automatic function, the cords 11 are fed while the difference of rotational speed occurs between the bobbin 8 and boss 52 on one hand and the casing 4 on the other.

When the boss 52 and bobbin 8 move downward by the action of the spring 20, the bottom bobbin teeth 48 are inserted into the recesses 50 of the plate 9. Then, the casing 4 and the plate 9 slip by approximately $2_\pi/16$ radians relative to the bobbin 8. Then, as previously mentioned, the cords 11 are fed while the bobbin 8 slips relative to the casing 4. When the bottom bobbin teeth 48 engage the recesses 50 of the plate 9, the bobbin 8 and the boss 52 again rotate together with the plate 9 and the casing 4.

Therefore, the fifth embodiment allows the operator to freely set the length of the cord 11 by hitting the boss 52 against the ground as desired.

Figure 49:
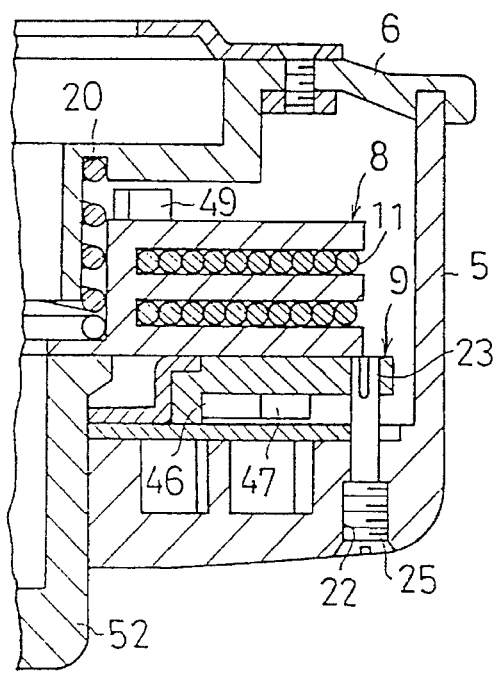

In another mode shown in FIG. 49, stopper pins 25 are inserted into the bores 22 of the housing 5 and the bores 23 of the plate 9. The stopper pins 25 prevent the cords 11 from being automatically fed and allow only the tap-and-go system to operate.

Sixth embodiment

The sixth embodiment of the present invention is described below with reference to FIGS. 50 through 58. Again the differences from the first embodiment are stressed.

Figure 50:
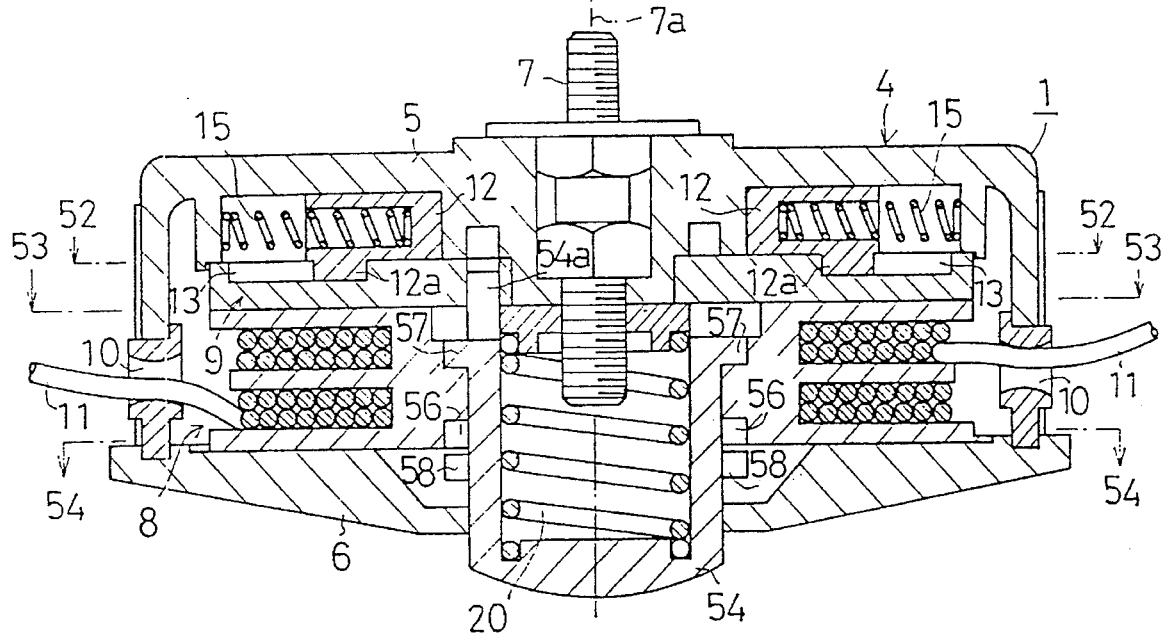
FIGS. 50 through 58 show a sixth embodiment of the present invention.
Figure 53:
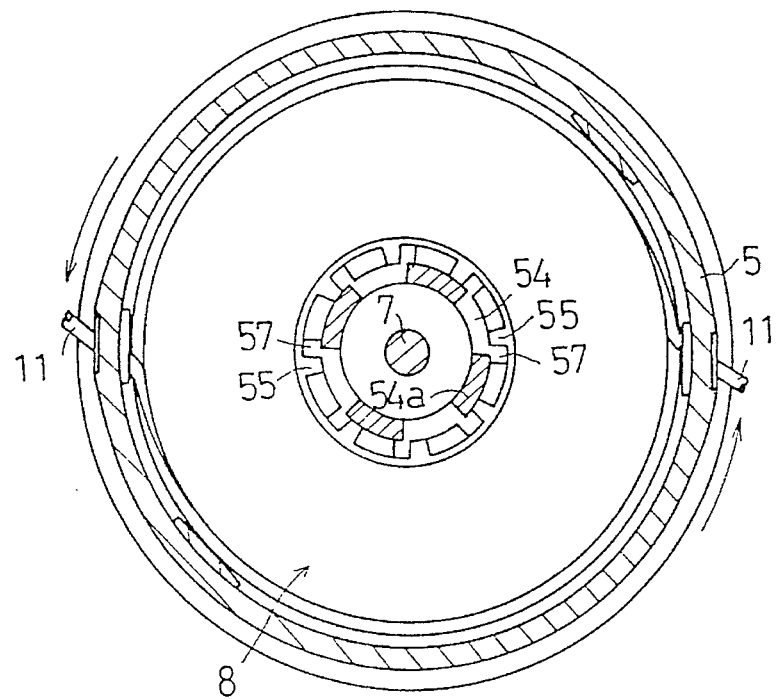

As shown in FIG. 50, a center boss 54 is movably located at the center of a bobbin 8 and a control plate 9 along an axis 7a. The boss 54 is exposed outside through the center of a cover 6. As shown in FIGS. 50 and 53, a plurality of engaging projections 54a protrude from the boss 54 and slidably engage the plate 9. The boss 54 can always rotate together with the plate 9 due to the projections 54a.

Figure 54:
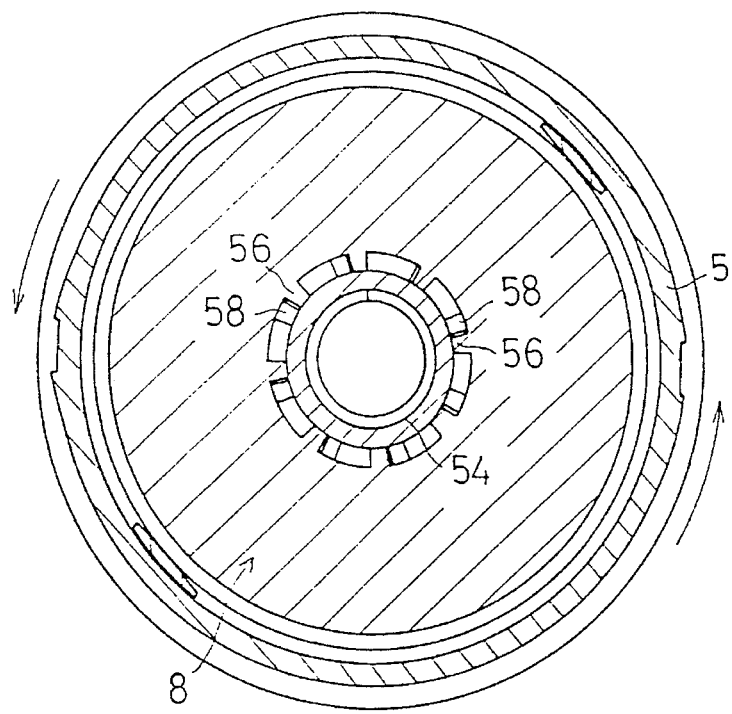

As shown in FIG. 53, eight teeth 55 are formed on the top margin of the inner periphery of the bobbin 8 at equally spaced intervals. As shown in FIG. 54, eight teeth 56 are also formed on the bottom margin of the inner periphery of the bobbin 8 at equally spaced intervals. The top teeth 55 and the bottom teeth 56 are located at the same angular positions along the periphery.

Eight teeth 57 are formed on the top margin of the outer periphery of the boss 54 at equally spaced intervals and eight teeth 58 are formed at the bottom side of the outer periphery of the boss 54 at equally spaced intervals. The top teeth 57 are displaced from the bottom teeth 58 by $2_\pi/16$ radians.

The boss 54 is urged downward by the spring 20 supported by the housing 5. The top teeth 57 of the boss 54 are engaged with the top teeth 55 of the bobbin 8 by the action of the spring 20. The bottom teeth 56 of the bobbin 8 are separated from the bottom teeth 58 of the boss 54.

Figure 55:
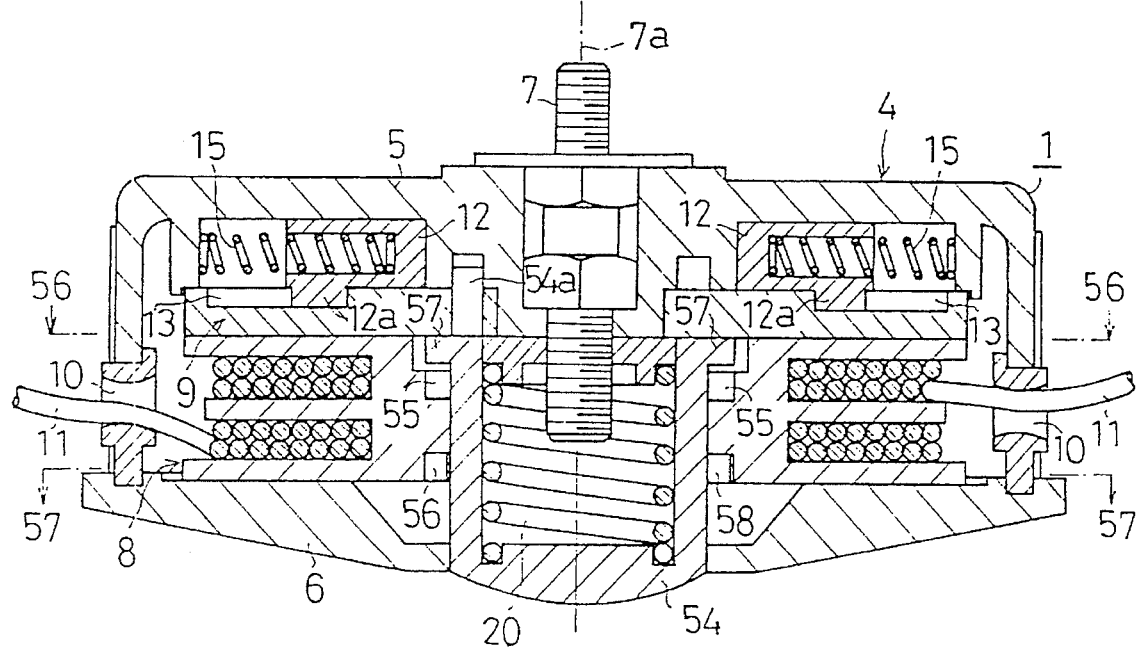
Figure 56:
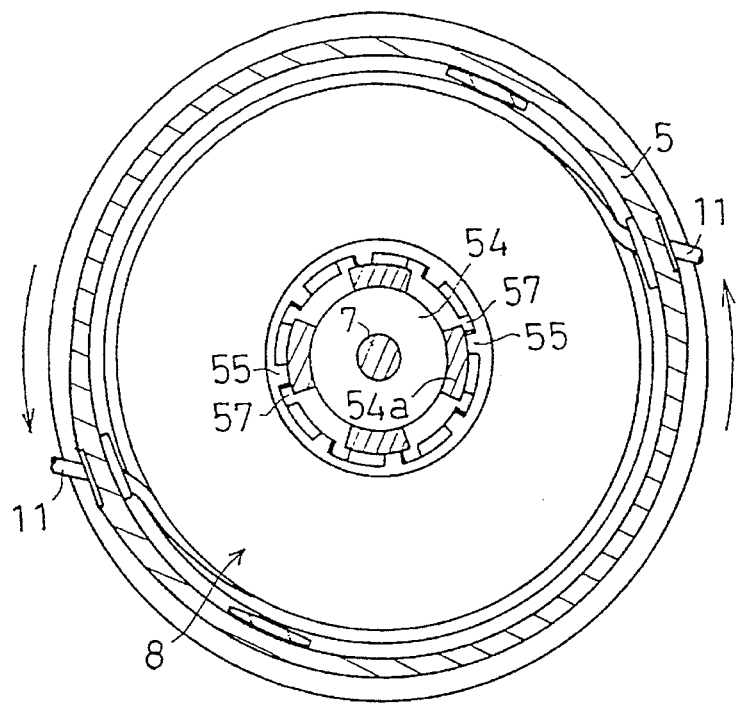
Figure 57:
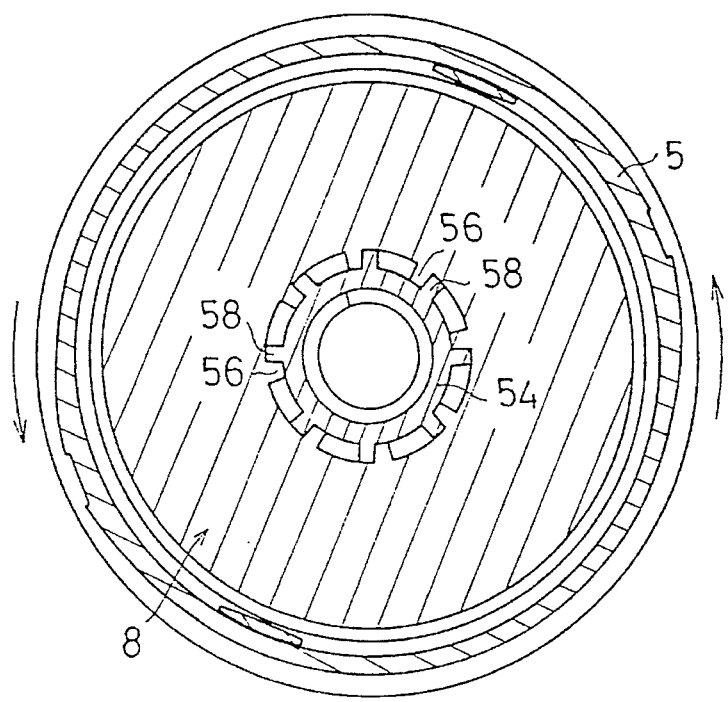

As shown in FIGS. 55, 56, and 57, when the boss 54 is moved upward against the action of the spring 20, the top teeth 57 of the boss 54 are separated from the top teeth 55 of the bobbin 8. The bottom teeth 58 of the boss 54 then engage with the bottom teeth 56 of the bobbin 8.

Figure 51:
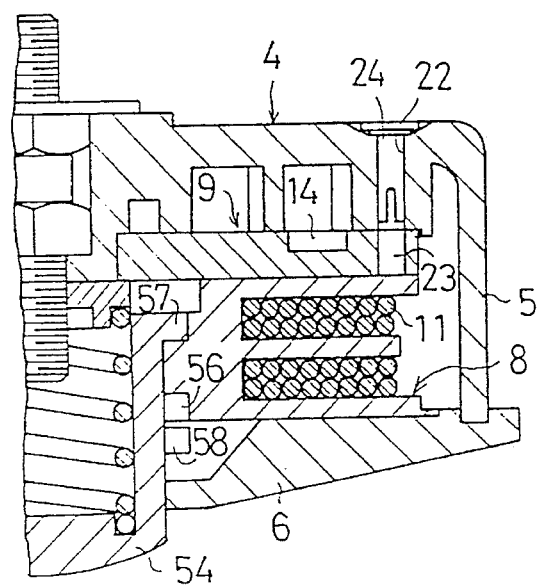
Figure 52:
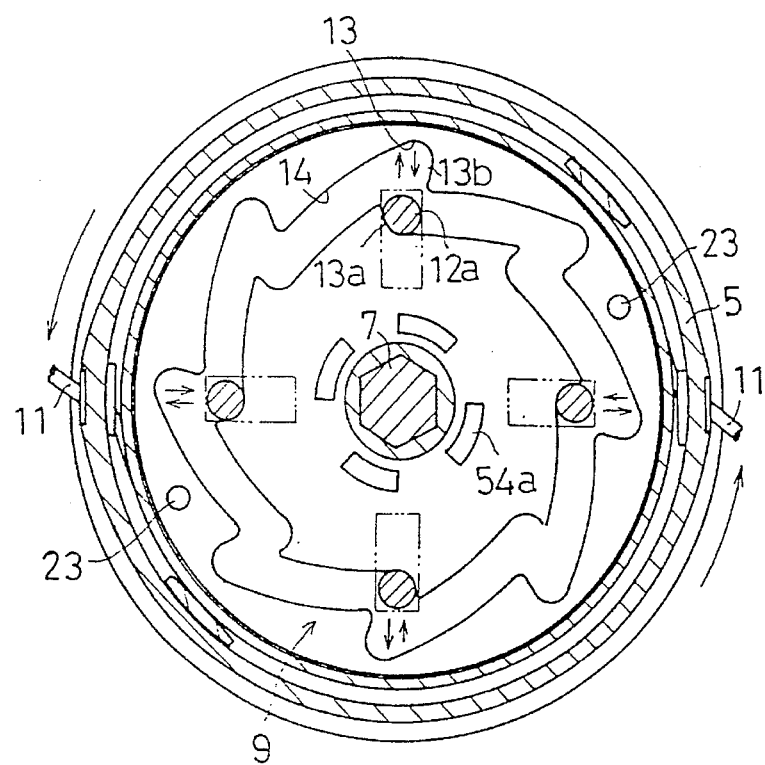

As shown in FIG. 51, when pins 24 are inserted into only bores 22 of the housing 5, a cutting head 1 has the automatic and tap-and-go functions simultaneously. When the casing 4 under the state shown in FIGS. 50 and 53 rotates, the plate 9 is rotated due to engagement between the link stud 12a of each link 12 and the inner step 13a of each radial groove 13.

Accordingly, the boss 54 rotates together with the plate 9 through the projections 54a. The bobbin 8 is also rotated together with the boss 54 due to engagement between the top teeth 57 of the boss 54 and the top teeth 55 of the bobbin 8. Cords 11 are rotated due to rotation of the casing 4 and the bobbin 8 to execute mowing.

When the cords 11 are worn off due to mowing, the speed of the casing 4 increases and the centrifugal force acting on each link 12 increases similarly to the procedure in the first embodiment. Then, the links 12 separate from the axis 7a against the action of a compression coil spring 15. The link studs 12a move from the stop position of each radial groove 13 to the release position.

In this case, rotation of the casing 4 is not transmitted to the plate 9, and the boss 54 and the bobbin 8 slip relative to the casing 4. This actions feeds, the cords 11.

When the bobbin 8 slips by approximately $2_\pi/8$ radians relative to the casing 4 and the cords 11 are extended by a corresponding length, the speed of the casing 4 decreases and the centrifugal force acting on each link 12 decreases.

Accordingly, the links 12 moved toward the axis 7a by the action of the spring 15 and the link stud 12a move to the stop position of the adjacent radial groove 13. Then, the plate 9, boss 54 and bobbin 8 rotate again together with the casing 4. Thus, the sixth embodiment automatically feeds the cords 11 when the cords 11 wear off by a certain length, similarly to the first embodiment.

The following is the description for use of the tap-and-go system. When the boss 54 under the state shown in FIGS. 50, 53 and 54 is hit against the ground, the boss 54 moves upward against the action of the spring 20. Then, the bottom teeth 58 of the boss 54 enter the rotational route of the bottom teeth 56 of the bobbin 8 as shown in FIGS. 55, 56 and 57.

When the plate 9, boss 54 and casing 4 slip by approximately $2_\pi/16$ radians relatively to the bobbin 8, the bottom teeth 56 of the bobbin 8 engage the bottom teeth 58 of the boss 54. Then, the bobbin 8 rotates again together with the casing 4. Thus, the cords 11 are fed while the bobbin 8 slips relatively to the casing 4, similarly to the procedure in the automatic system.

When the boss 54 is moved downward by the action of the spring 20, the top teeth 57 of the boss 54 enter the rotational route of the top teeth 55 of the bobbin 8. When the plate 9, boss 54 and casing 4 slip by approximately $2_\pi/16$ radians relatively to the bobbin 8, the cords 11 are fed from the casing 4 as above mentioned. When the top teeth 55 of the bobbin 8 engage with the top teeth 57 of the boss 54, the bobbin 8 rotates again together with the plate 9 and the boss 54. Therefore, the sixth embodiment allows the operator to freely set the length of the cord 11 by hitting the boss 54 against the ground as desired.

Figure 58:
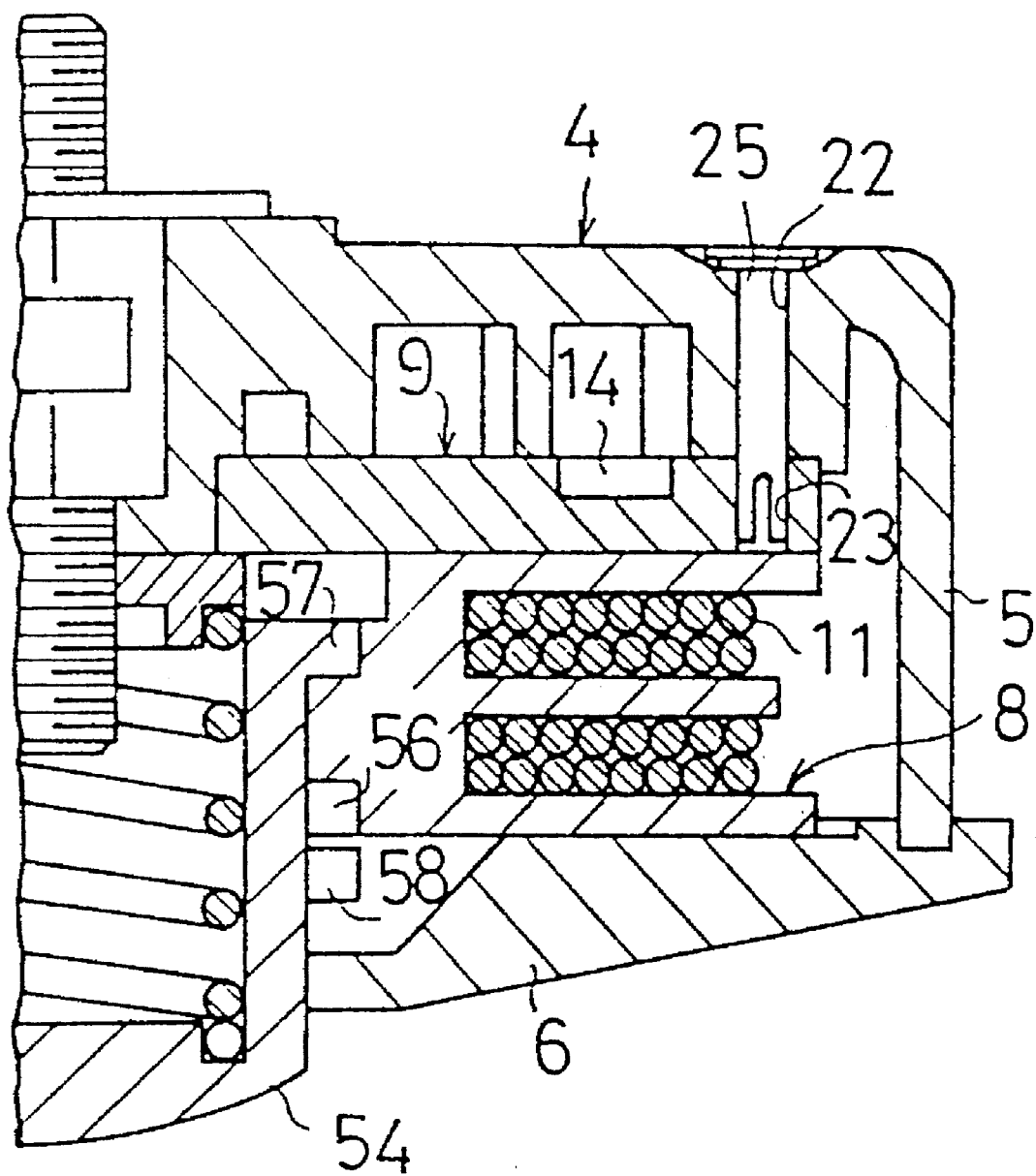

In another mode in FIG. 58, when stopper pins 25 are inserted into the bores 22 of the housing 5 and the bores 23 of the plate 9, automatic feed of the cords 11 is prohibited and only the tap-and-go system operates.

Seventh embodiment

The seventh embodiment of the present invention is described below with reference to FIGS. 59 through 66. Again the differences from the first embodiment are stressed.

Figure 59:
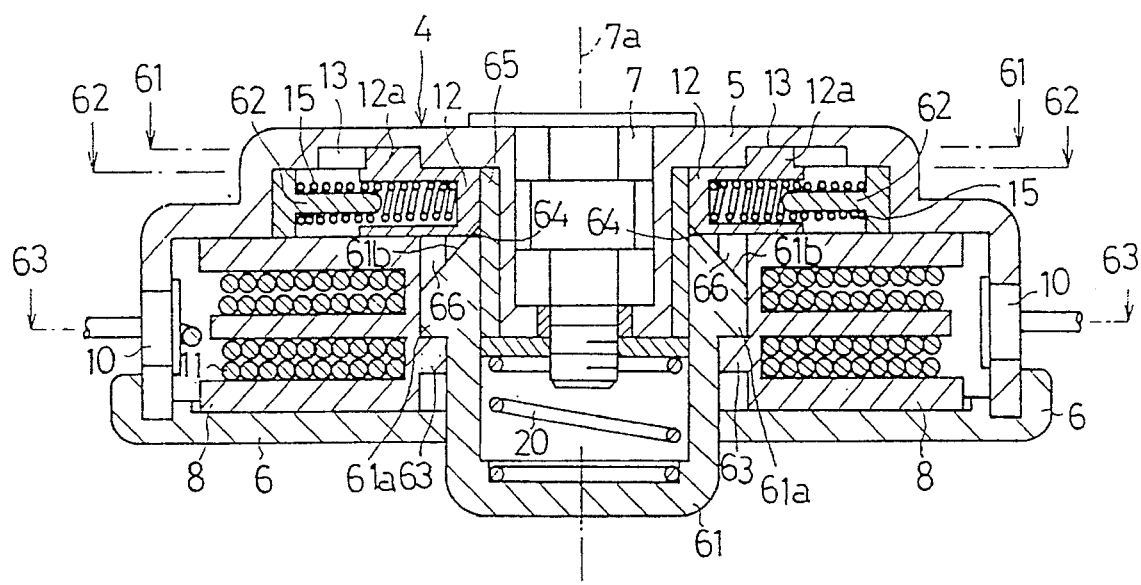
FIGS. 59 through 66 show the seventh embodiment of the present invention.
Figure 60:
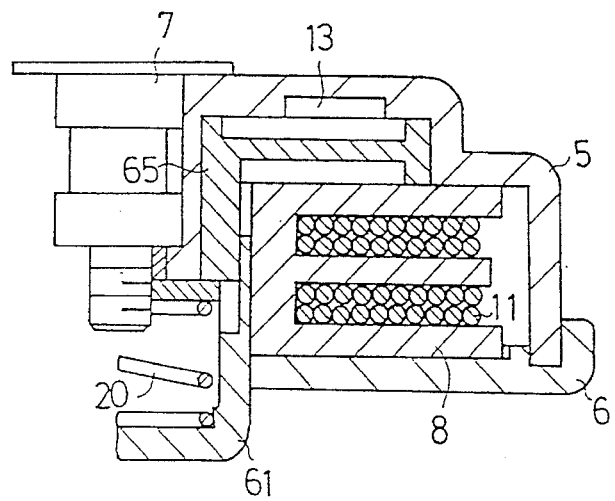
Figure 63:
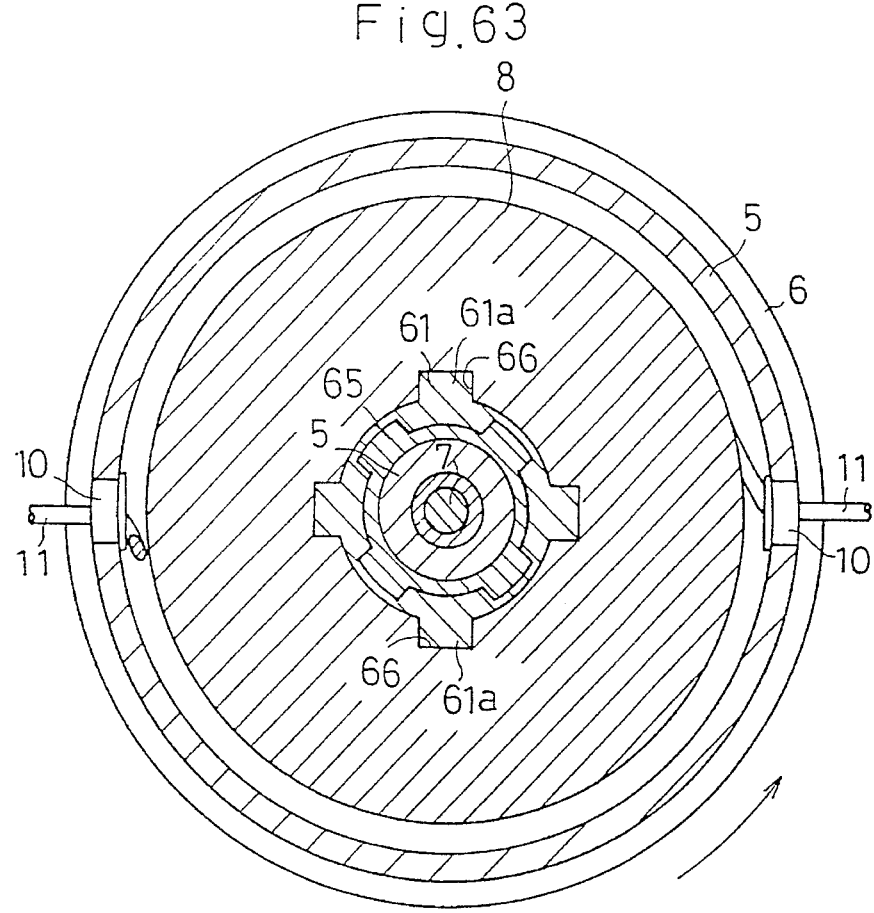

As shown in FIGS. 59 and 60, a drive link ring 65 is rotatably provided at the center of a rotary casing 4 about an axis 7a. As shown in FIG. 63, a center boss 61 is provided around the shaft of the ring 65. The boss 61 is spline-fitted with the ring 65. Therefore, the boss 61 can rotate together with the ring 65 and vertically move along the axis 7a.

A bobbin 8 is provided on the outer periphery of the boss 61. Spline grooves 66 are formed on the inner periphery of the bobbin 8. Spline keys 61a are formed on the outer periphery of the boss 61. The boss 61 can rotate together with the bobbin 8 and vertically move along the axis 7a due to engagement between the spline grooves 66 and the keys 61a.

The boss 61 is urged downward by a compression coil spring 20. The boss 61 is held in the casing 4 due to engagement between a step 63 constituting the spline grooves 66 of the bobbin 8 and the keys 61a of the boss 61.

Figure 61:
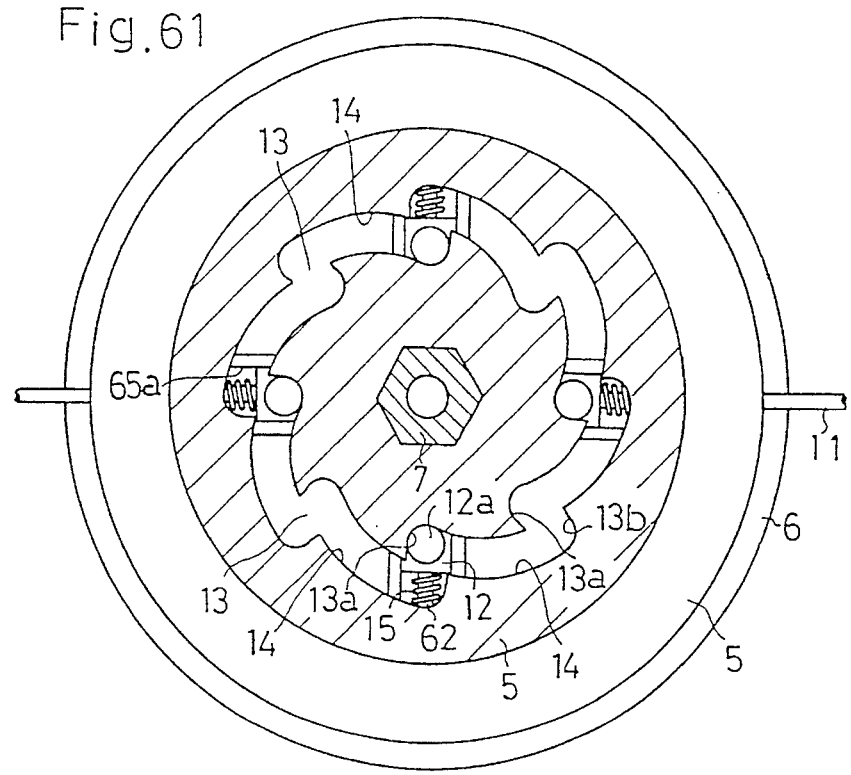
Figure 62:
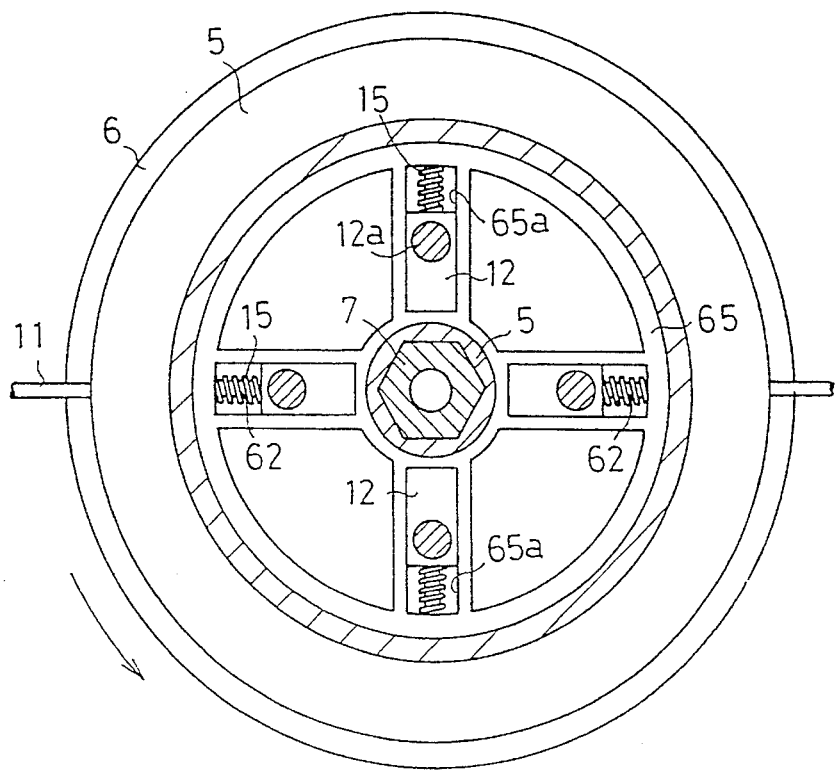

As shown in FIGS. 61 and 62, four guide grooves pairs 65a extending in the radial direction of the ring 65 are formed on the ring 65. As shown in FIG. 59, a pin 62 protrude radially inward from the ring 65 between every pair of guide grooves 65a. A drive link 12 is slidably placed in each guide groove pair 65a.

A compression coil spring 15 is positioned between each link 12 and the ring 65 around each projection 62. Each spring 15 urges each link 12 toward the shaft of the ring 65. Each link 12 placed and each spring 15 housed in the ring 65, and the ring 65, boss 61 and bobbin 8 rotate together in the casing 4.

Figure 64:
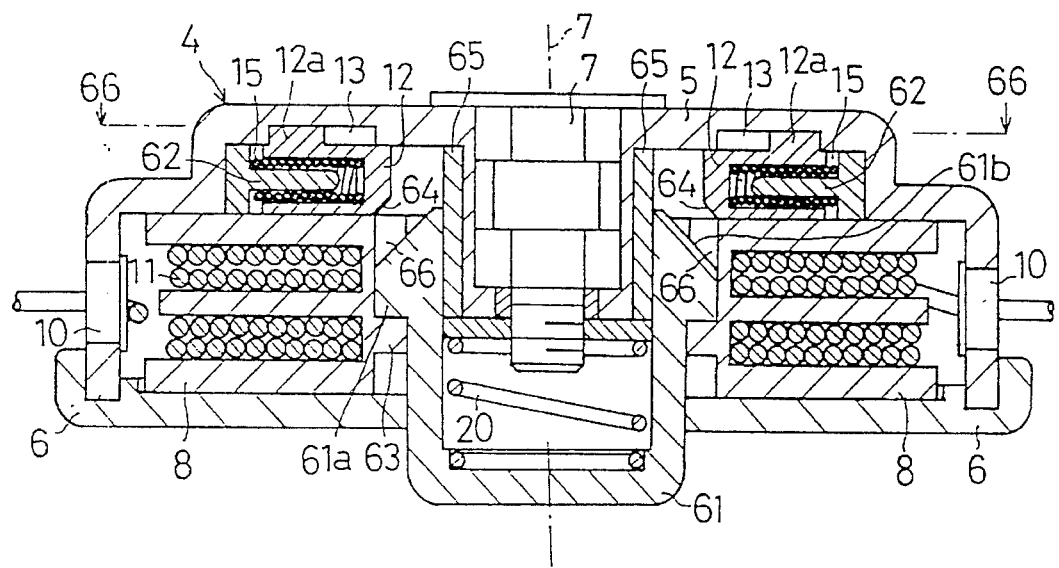
Figure 65:
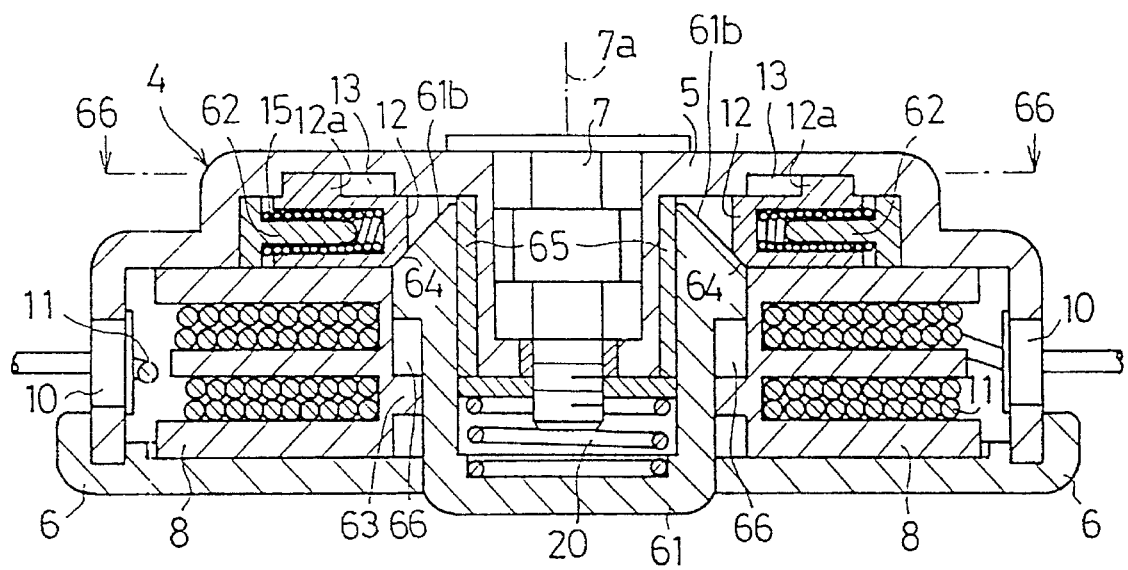

As shown in FIGS. 59, 64 and 65, tapered guide surface 61b are formed on the top end of the boss 61. The surfaces 61b extend up to the top of the keys 61a. A tapered surface corresponding to the tilt of the surface 61 is formed at the end of each link 12. Under the normal state shown in FIG. 59, the end of the boss 61 slightly enters the gap between each link 12 and the ring 65 while the end of the surface 61b of the boss 61 contacts a part of the surface 64 of each link 12.

As shown in FIGS. 59 and 61, radial grooves 13 and guide grooves 14 which are the same as those formed on the plate 9 of the first embodiment are formed on the inner surface of the housing 5. A link stud 12a mounted on the top of each link 12 is inserted into each radial groove 13 of the housing 5.

When the casing 4 under the state shown in FIGS. 59 and 61 rotates, the bobbin 8 is rotated together with the casing 4 due to engagement between the link studs 12a and the inner steps 13a of the radial grooves 13. Then mowing is executed by cords 11 extended from cord feed slots 10.

Figure 66:
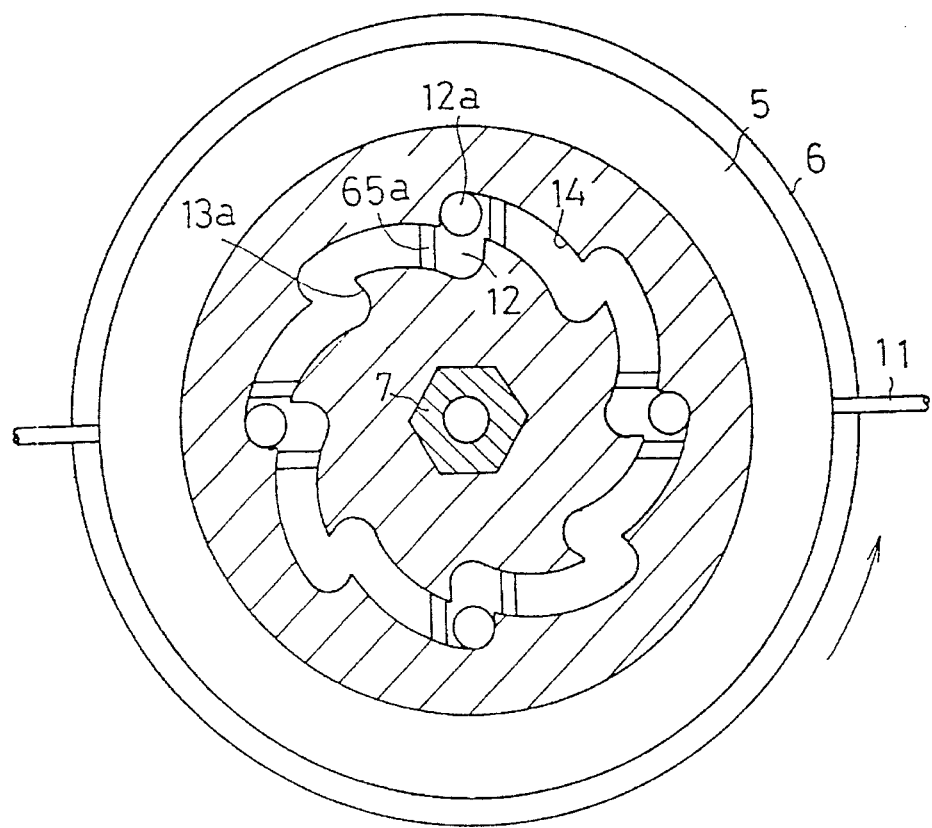

When the speed of the casing 4 increases due to wearing of the cords 11, the centrifugal force acting on each link 12 increases similarly to the procedure in the first embodiment. In this case, each link 12 separates from the axis 7a against the action of the spring 15 as shown in FIGS. 64 and 66. Then, the stud 12a of each link 12 moves from the stop position to the release position of each radial groove 13. The bobbin 8 is ready to slip relative to the casing 4.

Thus, similarly to the procedure in the first embodiment, when the bobbin 8 slips relative to the casing 4, the cords 11 are fed out of the casing 4 by the length corresponding to the difference of rotational angle between the bobbin 8 and the casing 4.

When the speed of the casing 4 decrease due to feed of the cords 11 and the centrifugal force acting on each link 12 decreases, each link 12 is returned to the position shown in FIGS. 59 and 61 by the action of the spring 15. Then, the bobbin 8 rotates again together with the casing 4. Thus, the seventh embodiment makes it possible to automatically feed the cords 11 when the cords 11 are consumed, similarly to the first embodiment.

The cords 11 can also be fed by hitting the boss 61 against the ground, similarly to the procedure in the first embodiment. That is, during tapping of the boss 61, the boss 61 moves upward against the action of the spring 20. And the top end of the boss 61 deeply enters the gap between each link 12 and the shaft of the ring 65 as shown in FIG. 65.

As the boss 61 moves upward, each link 12 is pushed out against the action of the spring 15 so that it separates from the axis 7a due to engagement between the surface 61 of the boss 61 and the surface 64 of each link 12. Thus, engagement between the stud 12a of each link 12 and the inner step 13a of each radial groove 13 is released. The bobbin 8 is ready to slip relatively to the casing 4. Therefore, the cords 11 are fed out of the slot 10, similarly to the procedure in the automatic feed.

When the state of hitting the boss 61 against the ground is released, the boss 61 is returned to the position shown in FIG. 59 by the action of the spring 20. As the boss 61 moves downward, the links 12 are pushed back by the action of the springs 20 so that they approach the axis 7a. When the links 12 return to the position shown in FIG. 59, the bobbin 8 rotates again together with the casing 4. Thus, the seventh embodiment allows the operator to freely feed the cords 11 by tapping as desired, similarly to the first embodiment.

Eighth embodiment

The eighth embodiment of the present invention is described below with reference to FIGS. 67–72.

Figure 67:
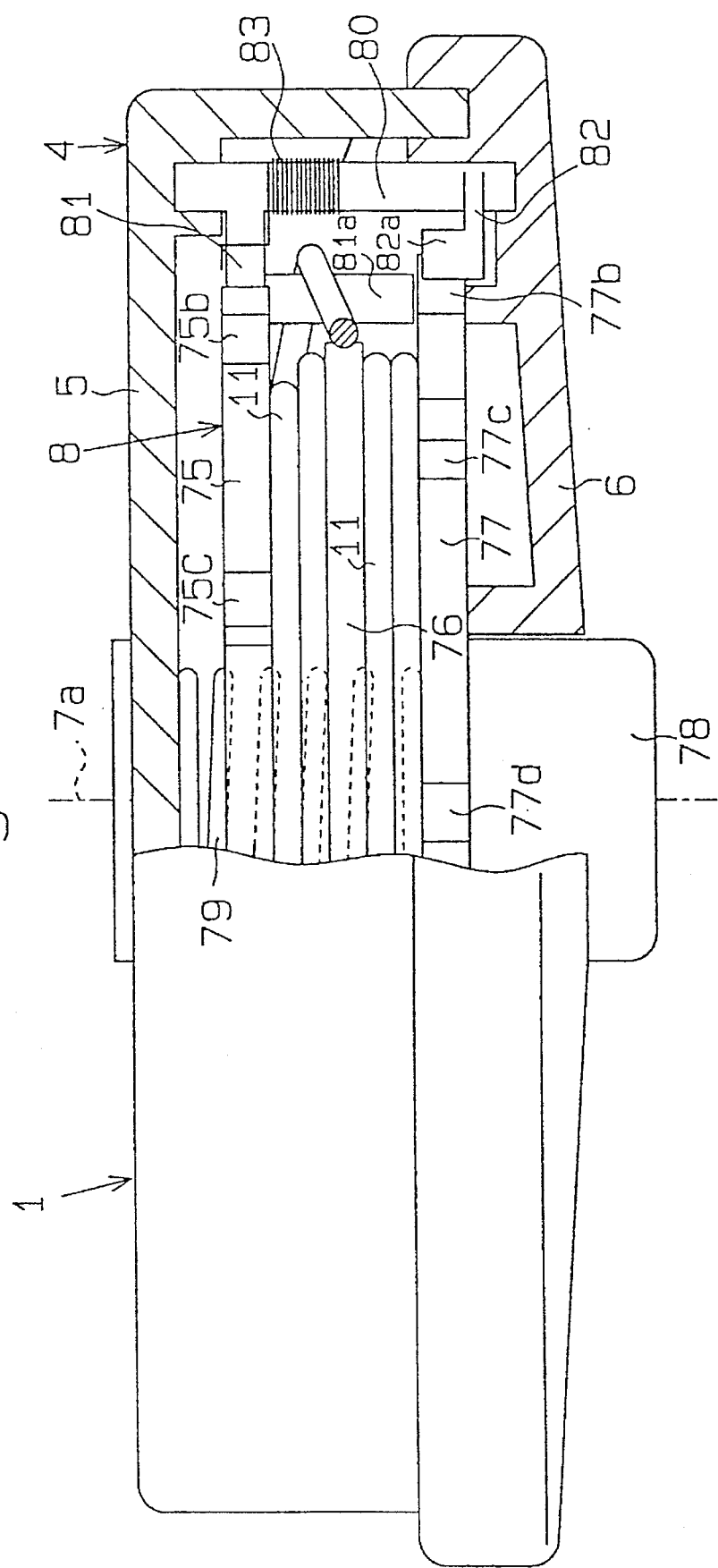
FIGS. 67 through 72 show the eighth embodiment of the present invention.
Figure 68:
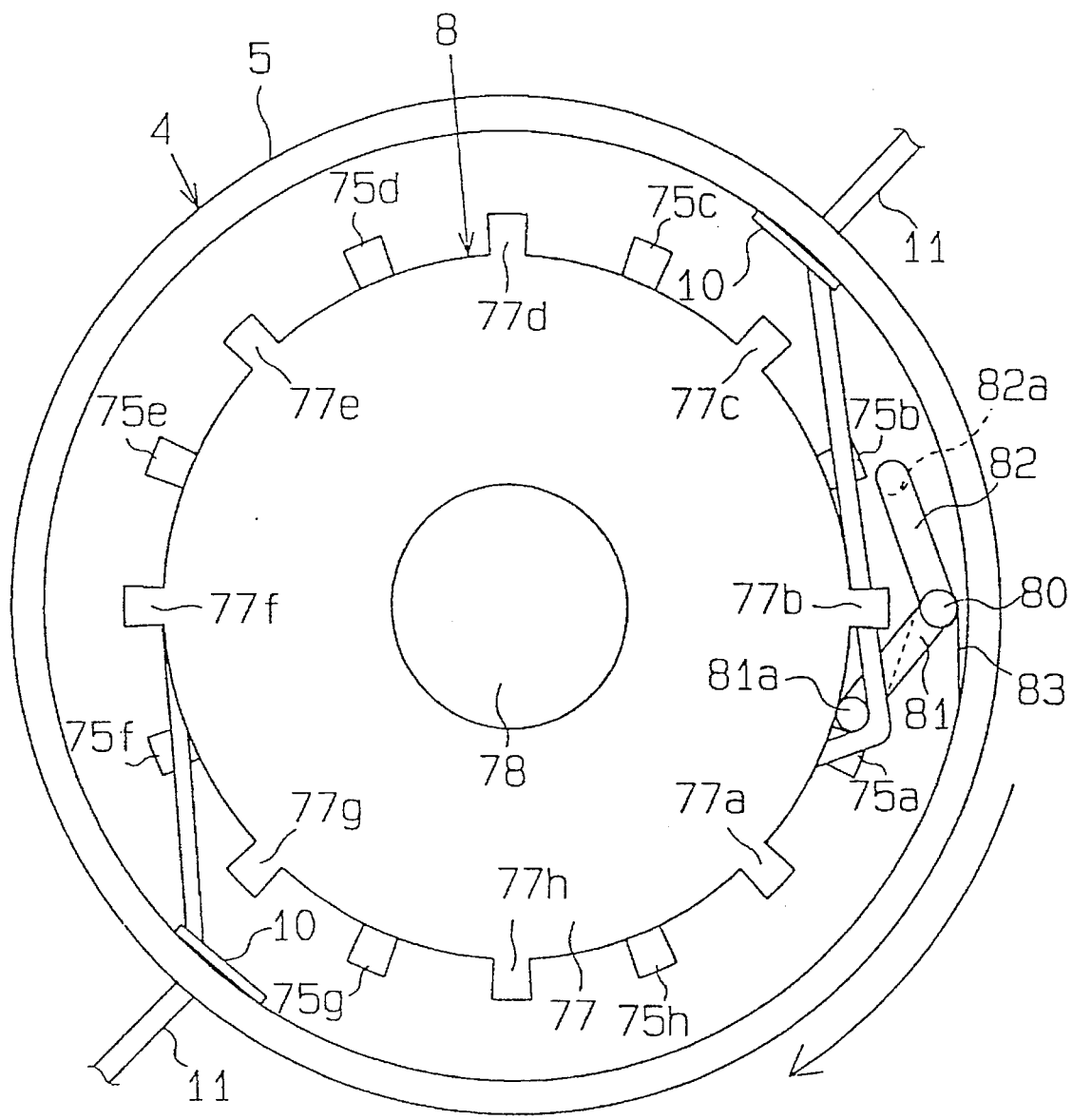

As shown in FIGS. 67 and 68, a bobbin 8 is provided in a rotary casing 4 consisting of a housing 5 and a protective cover 6. The bobbin 8 can rotate about and vertically slide along an axis 7a of the casing 4.

The bobbin 8 is constructed by connecting an upper flange 75 with a lower flange 77 by a cylindrical body (not illustrated). Eight teeth 75a–75h are formed on the outer periphery of the upper flange 75 at equally spaced intervals. Similarly, eight teeth 77a–77h are formed on the outer periphery of the lower flange 77 at equally spaced intervals. The upper flange teeth 75a–75h are displaced from the lower flange teeth 77a–77h of the lower flange 77 by the angle of $2_\pi/16$ radians respectively.

A center boss 78 is located at the bottom center of the bobbin 8. A compression coil spring 79 is provided in the cylindrical body of the bobbin 8. The top end of the spring 79 contacts the housing 5 and the bottom end of it contacts the lower flange 77. The spring 79 urges the bobbin 8 and the boss 78 downward, and the bottom end of the boss 78 protrudes under the cover 6.

As shown in FIGS. 67 and 68, a swing lever 80 is rotatably supported between the housing 5 and the cover 6 in the casing 4. The lever 80 has a first arm 81 at the position approximately corresponding to the height of the upper flange 75 and a second arm 82 at the position slightly lower than the lower flange 77. The arms 81 and 82 have approximately equal length and extend in the approximately opposite direction.

Latching legs 81a and 82a are protruded at the end of the first arm 81 and that of the second arm 82 respectively so that they are parallel with the axis 7a and approach each other. As shown in FIG. 67, the length of the leg 81a of the first arm 81 is slightly shorter than the interval between the flanges 75 and 77. The bottom end of the leg 81a does not contact the lower flange 77.

The leg 81a of the first arm 81 is longer and heavier than the leg 82a of the second arm 82, and the moment of inertia of the first arm 81 is larger than that of the second arm 82. Therefore, when centrifugal force acts on the lever 80 due to rotation of the casing 4, the lever 80 is swung so that the first arm 81 separates from the bobbin 8. A torsion coil spring 83 is wound on the lever 80. As shown in FIG. 68, the torsion spring 83 urges the lever 80 so that the leg 81a of the first arm 81 approaches the bobbin 8.

As shown in FIG. 67, a partition plate 76 is located between the flanges 75 and 77 of the bobbin 8. A cord 11 is wound between the upper flange 75 and the plate 76 and between the plate 76 and the lower flange 77 respectively. As shown in FIG. 68, the upper cord 11 is led to a cord feed slot 10 via the leg 81a of the first arm 81 and extended to the outside of the casing 4.

When the cords 11 are extended by a certain length or more out of the slots 10, the end of the first arm 81 engages with the tooth 75a of the upper flange 75 as shown in FIGS. 68. Therefore the bobbin 8 rotates together with the casing 4.

The force F1 acts on the lever 80, which swings the lever 80 so that the first arm 81 separates from the bobbin 8 due to rotation of the casing 4. A tensile force of the cord 11 tends to further extend the cord 11 outward on the basis of the centrifugal force due to rotation of the casing 4 and the resistance produced when the cord 11 collides with grass. Then, the tensile force acts on the lever 80 as the force F2 for swinging the lever 80 so that the first arm 81 approaches the bobbin 8.

When the extended length of the cord 11 is secured at a certain value or more, the speed of the casing 4 is kept at the normal speed range (4,000 to 6,000 rpm). In this case, the sum of the force F2 caused by the tension of the cord 11 and the urging force F3 of the spring 83 is larger than the force F1 caused by the centrifugal force acting on the lever 80. Therefore, as shown in FIG. 68, the lever 80 is held at the position where the first arm 81 engages with the tooth 75a of the upper flange 75. As a result, the casing 4 rotates together with the bobbin 8.

Under the above state, the cord 11 is not fed from the bobbin 8. The leg 82a of the second arm 82 is placed outside the rotational route of the teeth 77a–77h of the lower flange 77.

Figure 69:
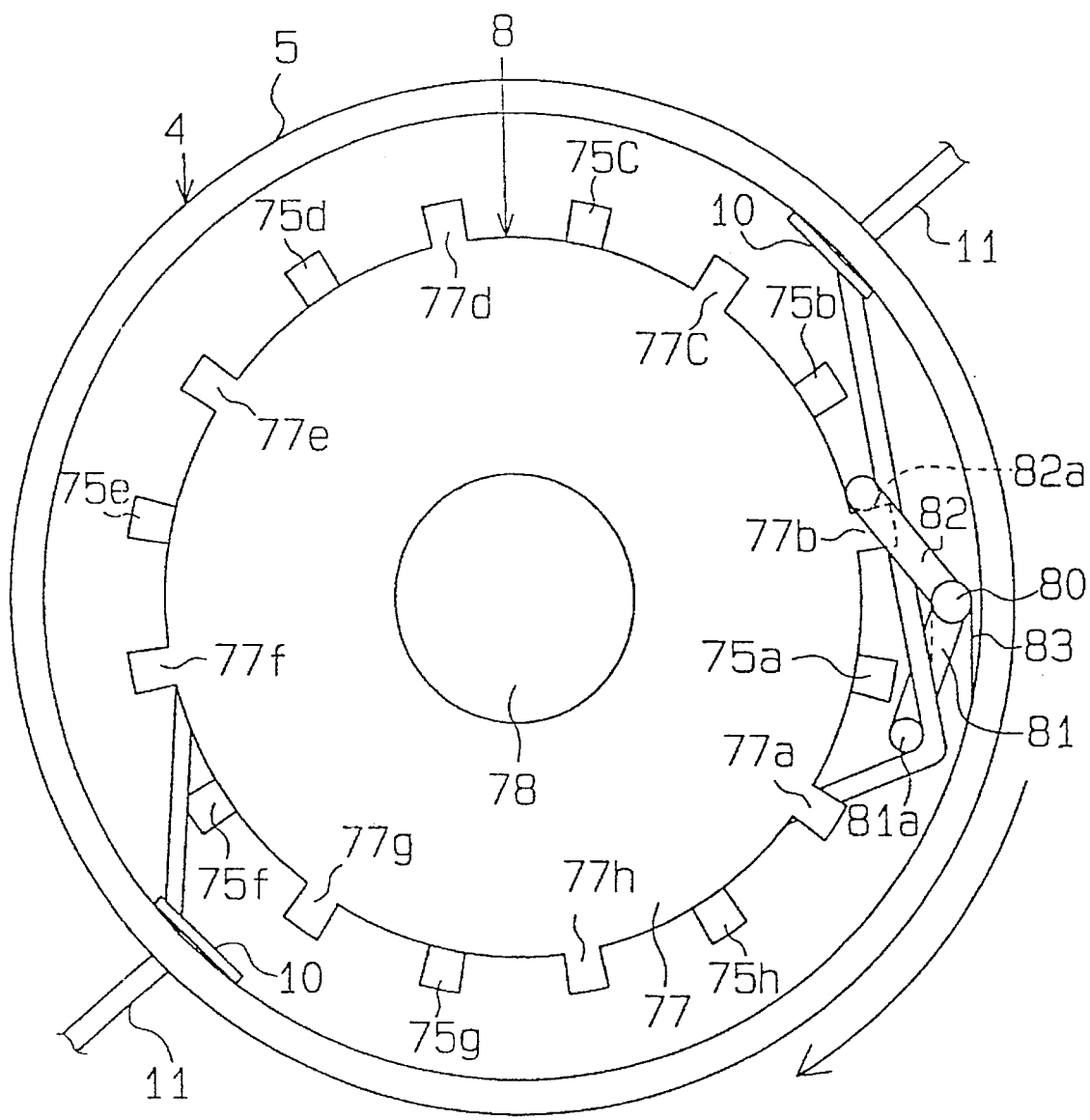

When the cord 11 is worn off due to mowing, the speed of the casing 4 increases similarly to the procedure in the first embodiment and the centrifugal force acting on the lever 80 increases. Then, the force F1 caused by the centrifugal force acting on the lever 80 gets larger than the sum of the force F2 caused by the tension of the cord 11 and the urging force F3 of the spring 83. Accordingly, as shown in FIG. 69, the lever 80 is swung so that the first arm 81 separates from the bobbin 8. According to the swing, the leg 82a of the second arm 82 is brought into the rotational route of the teeth 77a through 77h of the lower flange 77.

When the end of the first arm 81 disengages from the tooth 75a of the upper flange 75, the bobbin 8 slips relative to the casing 4. When the bobbin 8 slips by $2_\pi/16$ radians relative to the casing 4, the tooth 77b of the lower flange 77 engages with the leg 82a of the second arm 82. The bobbin 8 rotates again together with the casing 4. According to relative rotation between the bobbin 8 and the casing 4, the cords 11 are fed outside the casing 4 by the length corresponding to the difference of rotational angle between the bobbin 8 and the casing 4.

When the speed of the casing 4 decreases because the cord 11 is fed outward, the centrifugal force acting on the lever 80 decreases and the force F1 for the lever 80 to push back the cord 11 decreases. Then, the sum of the force F2 caused by the tension of the cord 11 and the urging force F3 of the spring 83 gets larger than the force F1. The lever 80 returns from the position in FIG. 69 to the position in FIG. 68.

When the leg 82a of the second arm 82 disengages from the tooth 77b of the flange 77, the bobbin 8 slips relative to the casing 4 similarly to the above mentioned embodiments. When the bobbin 8 slips by $2_\pi/16$ radians relatively to the casing 4, the end of the first arm 81 engages with the tooth 75h of the upper flange 75. Thus, the cords 11 are fed outside the casing 4 by the length corresponding to the difference of rotational angle between the bobbin 8 and the casing 4. Therefore, as the cords 11 are worn off, they are automatically fed outside the casing 4 by the length corresponding to the angle of $4_\pi/16$ radians.

Figure 70:
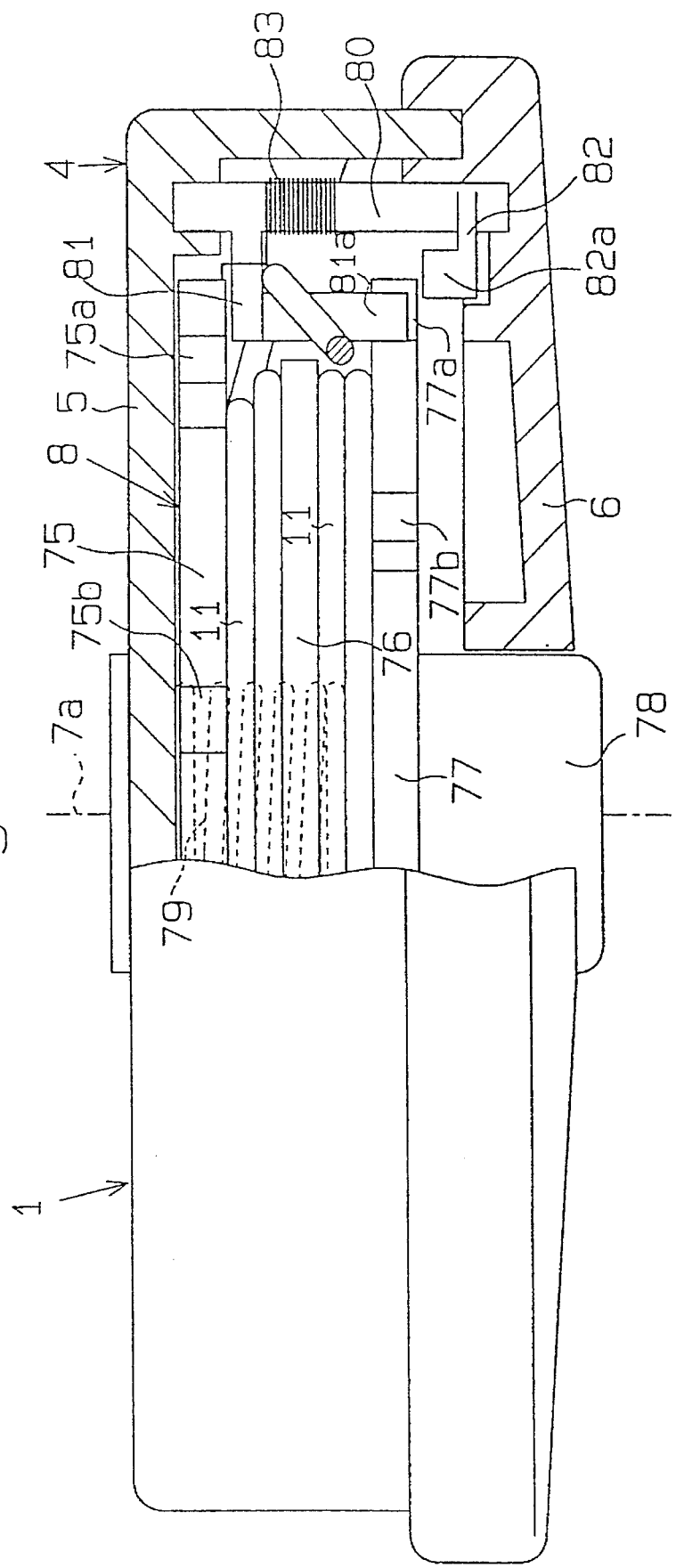

The following is the description for feed of the cords 11 by the tap-and-go function. When the boss 78 of a cutting head 1 under the state shown in FIGS. 67 and 68 is hit against the ground, the boss 78 and the bobbin 8 move upward against the action of the spring 79 as shown in FIG. 70. Accordingly, the tooth 75a of the upper flange 75 disengages from the end of the first arm 81, the bobbin 8 is ready to slip relatively to the casing 4. According to rotation of the casing 4, the bobbin 8 slips by $2_\pi/16$ radians relatively to the casing 4. Then, as shown in FIG. 70, the tooth 77a of the lower flange 77 engages with the leg 81a of the first arm 81. Thus, the cords 11 are fed outside the casing 4 by the length corresponding to the difference of rotational angle between the bobbin 8 and the casing 4.

When the state of hitting the boss 78 against the ground is released, the boss 78 and the bobbin 8 are moved downward by the action of the spring 79 and return to the state shown in FIG. 67. In this case, the tooth 77a of the lower flange 77 disengages from the leg 81a of the first arm 81. Then, similarly to the above mentioned, the bobbin 8 slips relatively to the casing 4 until the end of the first arm 81 engages with the tooth 75h of the upper flange 75. The cords 11 are fed outside the casing 4 by the length corresponding to the difference of rotational angle between the bobbin 8 and the casing 4.

Thus, the head 1 of this embodiment has both the automatic and tap-and-go cord feed functions. For this embodiment, only one lever 80 is used in the housing 5. However, it is possible to use a plurality of levers 80 corresponding to the number of slots 10.

Figure 71:
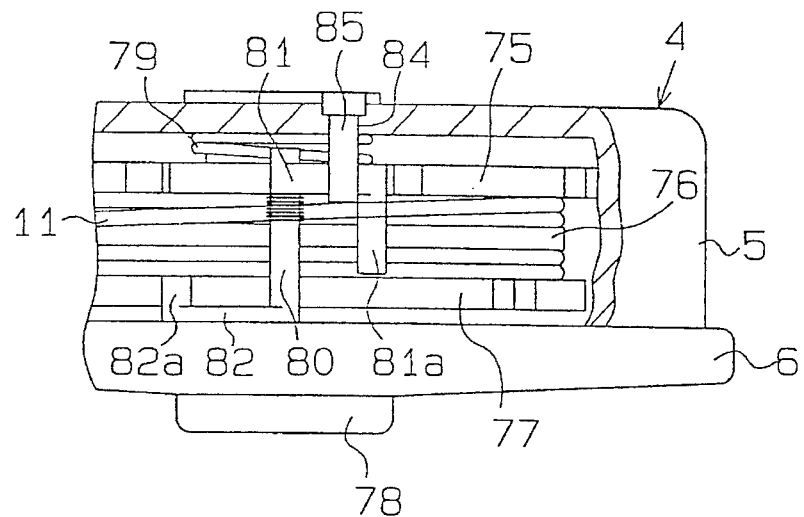
Figure 72:
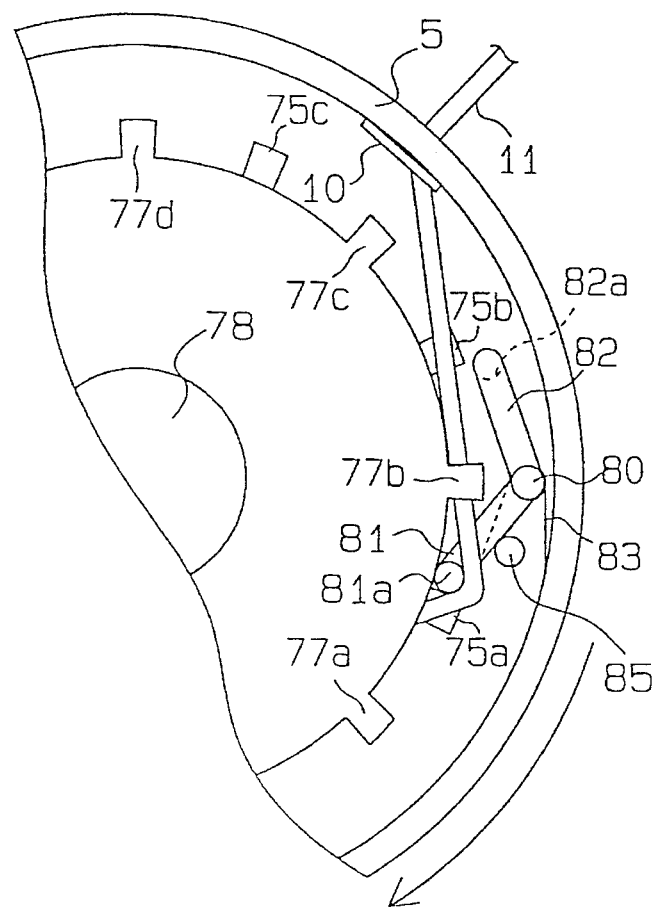

In another mode shown in FIGS. 71 and 72, a bore 84 is formed on the housing 5 and a stopper pin 85 is inserted into the bore 84. The pin 85 has the length from the housing 5 to the first arm 81 of the lever 80. The pin 85 engages with the first arm 81 to inhibit the swing of the lever 80 caused by the centrifugal force. Therefore, insertion of the pin 85 into the bore 84 prevents the cords 11 from being automatically fed and allows only the tap-and-go system to operate.

Although eight embodiments of the present invention have been described herein, it should be apparent to those skilled in the art that the present invention may be embodied in many other specific forms without departing from the spirit or scope of the invention. For example, the present invention may be executed in the following modes.

It is possible to arrange the long stopper pins used for some of the above embodiments so that they can move between the position where their ends stop within the bores of the housing and the position where their ends reach up to the bores of the control plate. In this case, a remote-controller may be combined with the cutting head to control the position of the pins.

Only one slot 10 or multiple slots 10 may be provided on the cutting head 1. Then the number of cords 11 can be changed according to the number of slots 10.

Eight radial grooves 13 and guide grooves 14 of the plate 9 are used for some of the above embodiments. However, the number of those grooves can be changed in the range of 6 to 12. Also, the number of links 12 can be changed according to the number of the grooves. Therefore, the present examples and embodiments are to be considered as illustrative and not restrictive and the invention is not to be limited to the details giving herein, but may be modified within the scope of the appended claims.

We claim:

1. A cutting head for a cord-type mower having a motor for driving the cutting head, the cutting head being capable of automatic and manual cord feeding, the cutting head comprising:

a casing driven by the motor to rotate about an axis;

a bobbin disposed within said casing, and adapted to rotate around said axis relative to said casing, said bobbin being movable along said axis relative to said casing, between a first position and a second position;

a spring disposed within said casing for urging said bobbin toward said first position from said second position, said bobbin being switched from said first position to said second position against the action of said spring, in response to a tapping operation;

a cord having a distal end wound about said bobbin;

a cord feed slot provided on said casing, for permitting the distal end of said cord to extend outside said casing, to a suitable cutting position;

mutual linkage means provided in said bobbin and said casing, for coupling said bobbin in said first position to said casing, in order to cause them to rotate simultaneously;

rotation control means provided in said bobbin and said casing, for permitting said bobbin, already in said second position, to rotate by a predetermined angle, relative to said casing;

switching means for automatically switching said bobbin between said first and second positions, in accordance with a rotational speed of said casing, which varies as a function of the length of the cord that is extended from said cord feed slot, said switching means including:

a tapered surface formed on said bobbin, in a radial direction relative to said axis, said tapered surface forming an aperture at the center of said bobbin;

a plurality of drive links provided in said casing, for reciprocating relative to said axis, along said tapered surface, each drive link being capable of moving between an operational position for pressing said bobbin toward said second position against the action of said urging means, and a retracted position for permitting said bobbin to remain in said first position, without pressing said bobbin, each drive link moving to said operational position from said retracted position, according to centrifugal force of each drive link depending on the rotational speed of said casing, thereby causing said bobbin to be switched to said second position; and bias means for urging said drive links toward said retracted position from said operational position, said bias means including a plurality of springs for connecting adjacent drive links, whereby, when the rotational speed of said casing decreases as a function of the cord feeding, said bias means causes said drive links to return to said retracted position from said operational position, thereby permitting said bobbin to return to said first position.

2. The cutting head according to claim 1, wherein said mutual linkage means includes:

a plurality of first engaging portions formed on said bobbin around said axis; and a plurality of second engaging portions which are formed on the inner surface of said casing that faces the outer surface of said bobbin, and which are positioned such that they can be engaged with said first engaging portions.

3. The cutting head according to claim 1, wherein said rotation control means includes:

a plurality of first engaging portions formed on said bobbin around said axis; and a plurality of second engaging portions formed on said casing, such that they can be engaged with said first engaging portions when said bobbin is in said second position in response to a tapping operation, whereby the engagement of said first and second engaging portions prevent said bobbin from rotating relative to said casing, so as to determine the length of the cord to be extended.

4. The cutting head according to claim 1, wherein each of said drive links has a tapered surface for contacting said tapered surface of said bobbin.

5. The cutting head according to claim 1 further comprising stopper means, said stopper means abutting said drive links to prevent said drive links from moving to said operational position from said retracted position, said stopper means disabling the automatic feeding operation of the cutting head.

6. The cutting head according to claim 5, wherein said stopper means includes a plurality of pins fitted to said casing, for engaging each of said drive links.

* * * * *